(12) United States Patent
Collins

(10) Patent No.: US 7,379,419 B2
(45) Date of Patent: *May 27, 2008

(54) APPARATUS AND METHOD FOR PERFORMING AN ONLINE SOFTWARE UPGRADE OF RESOURCE SERVERS

(75) Inventor: David Allan Collins, Garland, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 912 days.

This patent is subject to a terminal disclaimer.

(21) Appl. No.: 10/641,336

(22) Filed: Aug. 13, 2003

(65) Prior Publication Data

US 2005/0036443 A1   Feb. 17, 2005

(51) Int. Cl.
*G01R 31/08* (2006.01)
(52) U.S. Cl. .................. 370/217; 717/171; 717/174
(58) Field of Classification Search ............... 717/171
See application file for complete search history.

(56) References Cited

U.S. PATENT DOCUMENTS

| | | | | |
|---|---|---|---|---|
| 5,155,837 A | * | 10/1992 | Liu et al. ............... | 709/221 |
| 5,410,703 A | * | 4/1995 | Nilsson et al. ............ | 717/168 |
| 6,463,584 B1 | * | 10/2002 | Gard et al. ................ | 717/171 |
| 6,966,058 B2 | * | 11/2005 | Earl et al. ................. | 717/171 |
| 2003/0125085 A1 | * | 7/2003 | Collins ..................... | 455/560 |
| 2004/0085359 A1 | * | 5/2004 | Steg et al. ................ | 345/771 |
| 2004/0128370 A1 | * | 7/2004 | Kortright ................. | 709/221 |
| 2004/0228310 A1 | * | 11/2004 | Collins .................... | 370/338 |
| 2004/0253956 A1 | * | 12/2004 | Collins .................... | 455/445 |

* cited by examiner

*Primary Examiner*—Kwang Bin Yao
*Assistant Examiner*—Sameer Aghera

(57) ABSTRACT

A switch for handling call connections between calling devices and called devices. The switch comprises: 1) at least one system management node associated with a configuration management controller, the configuration management controller for performing an online upgrade of software in the switch by loading upgraded software in a new partition while original software is executed in a reference partition; and 2) a plurality of computing nodes for executing primary-backup resource server applications. Each of the primary-backup resource server applications comprises a primary resource server application and a secondary resource server application residing on a different node than the primary resource server application. A plurality of the primary-backup resource server applications form a resource group and an address of the resource group is known in the reference partition and in the new partition.

11 Claims, 13 Drawing Sheets

APPARATUS AND METHOD FOR PERFORMING AN ONLINE SOFTWARE UPGRADE OF RESOURCE SERVERS

CROSS REFERENCE TO RELATED APPLICATIONS

This patent application is related to the inventions disclosed in:
1) U.S. patent application Ser. No. 10/439,256, entitled "SYSTEM AND METHOD FOR PROVIDING AN ONLINE SOFTWARE UPGRADE," which was filed on May 15, 2003; and
2) U.S. patent application Ser. No. 10/459,748, entitled "SYSTEM AND METHOD FOR PROVIDING AN ONLINE SOFTWARE UPGRADE IN LOAD SHARING SERVERS," which was filed on Jun. 12, 2003.

Patent application Ser. No. 10/439,256 and patent application Ser. No. 10/459,748 are commonly assigned to the assignee of the present invention. The disclosures of the related patent applications are hereby incorporated by reference for all purposes as if fully set forth herein

TECHNICAL FIELD OF THE INVENTION

The present invention is directed to telecommunication systems and, more specifically, to a system and method for providing an on-line software upgrade in load sharing servers.

BACKGROUND OF THE INVENTION

Wireless service providers continually try to create new markets and to expand existing markets for wireless services and equipment. One important way to accomplish this is to improve the performance of wireless network equipment while making the equipment cheaper and more reliable. Doing this allows wireless service providers to reduce infrastructure and operating costs while maintaining or even increasing the capacity of their wireless networks. At the same time, the service providers are attempting to improve the quality of wireless service and increase the quantity of services available to the end user.

The mobile switching center of a wireless network provides connections between a number of wireless network base stations and the public switched telephone network. Calls originated by, or terminated at, a cell phone or other mobile station are handled in the mobile switching center by a number of call processing client applications. A conventional mobile switching center typically contains a large switching fabric controlled by a main processing unit (MPU) that contains a large number of data processors and associated memories, often in the form of ASIC chips. Each of these MPU processors contains a call process client application for controlling the flow of control signals of a single call. Each call process client application in turn communicates with a call process server application that controls the flow of control signals for a large number of calls.

Thus, when a particular event occurs during a phone call (e.g., the call set-up, the invocation of three-way calling, call disconnection, or the like), control signals associated with the event are relayed from the mobile station to the call process client application in the mobile switching center (MSC). This call processing client application then relays the control signals to the call process server application, which actually performs the call processing service requested by the control signals.

It is important to keep the mobile switching center of a wireless network fully operational at all times. Typically, when a version of software in a mobile switching center must be upgraded, the mobile switching center must be temporarily taken "off line" is during the time that the new software is being installed. This requires the use of a backup or substitute mobile switching center to maintain a full level of call traffic management.

Therefore, there is a need for improved wireless network equipment and services for upgrading software in a mobile switching center of a wireless network. In particular, there is a need for a system and method for providing an online software upgrade to a mobile switching center so that a mobile switching center that receives a software upgrade does not have to be taken off line during the time of the software upgrade.

SUMMARY OF THE INVENTION

To address the above-discussed deficiencies of the prior art, it is a primary object of the present invention to provide a switch capable of handling call connections between calling devices and called devices. According to an advantageous embodiment of the present invention, the switch comprises: 1) at least one system management node associated with a configuration management controller, the configuration management controller capable of performing an online upgrade of software in the switch by loading upgraded software in a new partition while original software is executed in a reference partition; and 2) a plurality of computing nodes capable of executing primary-backup resource server applications, each of the primary-backup resource server applications comprising a primary resource server application and a secondary resource server application residing on a different node than the primary resource server application, wherein a plurality of the primary-backup resource server applications form a resource group and wherein an address of the resource group is known in the reference partition and in the new partition.

According to one embodiment of the present invention, all of the primary primary-backup resource server applications initially reside in the reference partition.

According to another embodiment of the present invention, the configuration management controller loads upgraded software of a first primary-backup resource server application resides in the new partition.

According to still another embodiment of the present invention, the configuration management controller is capable of partitioning an address space of a service request broker, wherein a first address of a first service request broker associated with the new partition is different than a second address of a second service request broker associated with the reference partition.

According to yet another embodiment of the present invention, the configuration management controller starts the upgraded software of the first primary-backup resource server application in the new partition with the first address of the first service request broker.

According to a further embodiment of the present invention, the configuration management controller tests the upgraded software of the first primary-backup resource server application after the upgraded software has been loaded into the new partition.

According to a still further embodiment of the present invention, in response to a determination that the upgraded software passes the test, the configuration management controller shuts down each computing node in the reference partition, installs the upgraded software in the reference partition, changes the service request broker address to the new partition, and restarts the nodes in the new partition.

This has outlined rather broadly several features of this disclosure so that those skilled in the art may better understand the DETAILED DESCRIPTION that follows. Additional features may be described later in this document. Those skilled in the art should appreciate that they may readily use the concepts and the specific embodiments disclosed as a basis for modifying or designing other structures for carrying out the same purposes of this disclosure. Those skilled in the art should also realize that such equivalent constructions do not depart from the spirit and scope of the invention in its broadest form.

Before undertaking the DETAILED DESCRIPTION below, it may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, or software, or a combination of at least two of the same. It should be noted that the functionality associated with any particular controller may be centralized or distributed, whether locally or remotely. Definitions for certain words and phrases are provided throughout this patent document, and those of ordinary skill in the art should understand that in many, if not most instances, such definitions apply to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 13, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged telecommunications network.

In the disclosure that follows, a group services framework for performing various distributed call processing functions is implemented in a mobile switching center of a wireless communication network. This is by way of illustration only and should not be construed so as to limit the scope of the invention. Those skilled in the art will understand that the online software upgrade system and method described below may be implemented in other types of telecommunication devices, including many varieties of switches, routers and the like.

Figure 1:
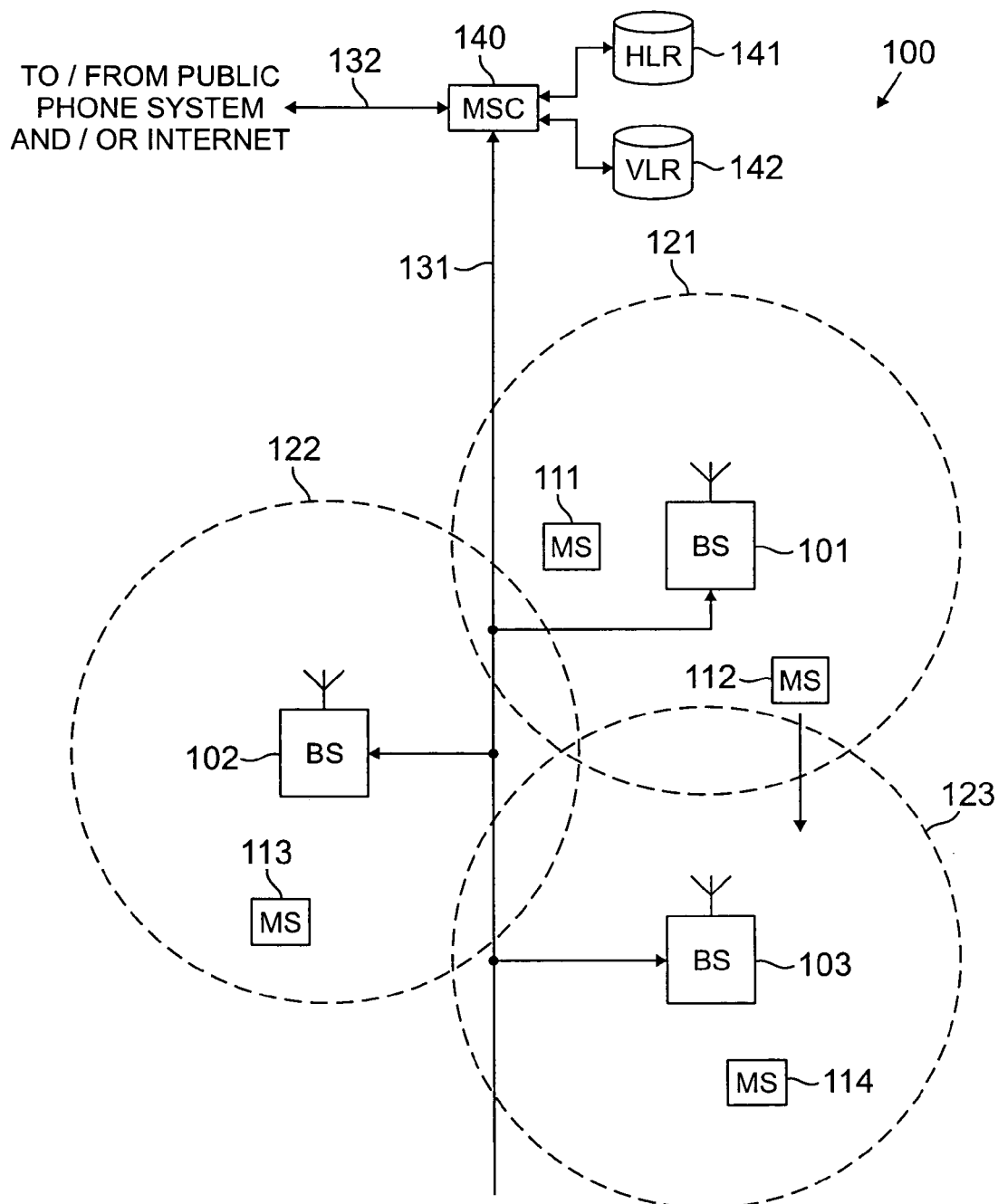
FIG. 1 illustrates an exemplary wireless network according to an advantageous embodiment of the present invention.

FIG. 1 illustrates exemplary wireless network 100 according to one embodiment of the present invention. Wireless network 100 illustrated in FIG. 1 is by way of illustration only and should not be construed to limit the scope of the invention. Those skilled in the art will understand that the present invention may be implemented in other types of telecommunication networks.

In the illustrated example, wireless network 100 comprises a plurality of cell sites 121-123. Each cell site 121-123 contains a base station (BS). BS 101 is in cell site 121, BS 102 is in cell site 122, and BS 103 is in cell site 123. Base stations 101-103 communicate with one or more mobile stations (MS) 111-114 over wireless connections (e.g., code division multiple access (CDMA) channels). Mobile stations 111-114 may represent any suitable wireless devices. For example, mobile stations 111-114 may represent conventional cellular telephones, personal communication services (PCS) handset devices, personal digital assistants (PDAs), portable computers, or metering devices. The present invention is not limited to mobile devices. Other types of access terminals, including fixed wireless terminals, may be used. However, for the sake of simplicity, only mobile stations are shown and discussed hereafter.

The dotted lines shown in FIG. 1 illustrate the approximate boundaries of the cell sites 121-123 in which base stations 101-103 are located. The cell sites are illustrated as being approximately circular for the purposes of illustration and explanation only. It should be clearly understood that the cell sites may have any other shape or shapes, depending on the cell configuration selected and the presence of natural and man-made obstructions.

As is well known in the art, cell sites 121-123 may comprise a plurality of sectors (not shown), each sector being illuminated by a directional antenna contained in or coupled to one of base stations 101-103. In the embodiment of the present invention shown in FIG. 1, base stations 101-103 are located in the center of cell sites 121-123. Other embodiments may position base stations 101-103 or directional antennas in any other suitable positions. The present invention is not limited to any one particular configuration of cell sites.

Base stations 101-103 transfer voice and data signals between each other and the public switched telephone network (PSTN) (not shown) via communication trunk lines 131, mobile switching center (MSC) 140, and communication trunk lines 132. Base stations 101-103 may also transmit and receive voice and data signals, such as packet, data, to and from the Internet or other data network (not shown) via communication trunk lines 131, mobile switching center (MSC) 140, and communication trunk lines 132. Base stations 101-103 transmit one or more pilot signals that are used by mobile stations 111-114 to detect and register with base stations 101-103. In addition, communication trunk lines 131 provide a connection path to transfer control signals between mobile switching center (MSC) 140 and base stations 101-103. The control signals may be used to establish connections for voice and data circuits, such as circuits between MSC 140 and base stations 101-103 over communication trunk lines 131 and between MSC 140 and the Internet or PSTN over communication trunk lines 132.

Communication trunk lines 131 and 132 may represent any suitable connection, including a T1 line, a T3 line, a fiber optic link, a network packet data backbone connection, or any other type of connection. In one embodiment, communication trunk lines 131 may link vocoders in base stations 101-103 with switch elements in the MSC 140. Those skilled in the art will recognize that the connections on communication trunk lines 131 and 132 may transmit analog voice band signals, digital voice signals in pulse code modulated (PCM) format, digital voice signals in IP format, digital voice signals in ATM format, or another suitable connection transmission protocol. Those skilled in the art will recognize that the connections on communication trunk lines 131 and 132 may provide a transmission path for the transmission of analog or digital control signals in a suitable signaling protocol.

MSC 140 provides services and coordination between subscribers using mobile stations 111-114 in the wireless network 100 and external networks, such as the PSTN or Internet. In some embodiments, communication trunk lines 131 may represent several different data links, where each data link couples one of base stations 101-103 to MSC 140.

MSC 140 may store information about mobile stations 111-114 in home location register (HLR) 141 and in visitor location register (VLR) 142. In one embodiment, wireless network 100 may be a "home" network for mobile stations 111-114 that belong to wireless network 100. Other mobile stations that belong to other networks may roam into or visit wireless network 100. In this embodiment, HLR 141 stores information about mobile stations 111-114 that belong to wireless network 100 and VLR 142 stores information about mobile stations 111-114 that are visiting wireless network 100.

Figure 2:
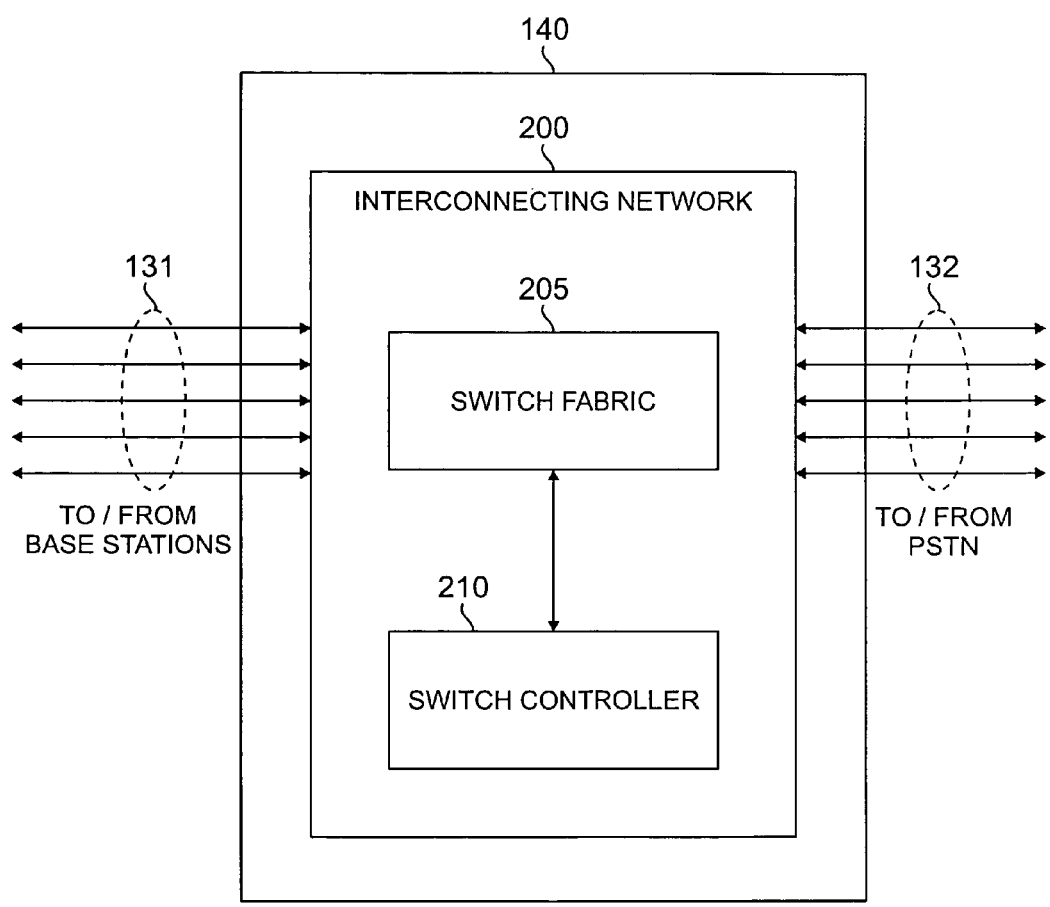
FIG. 2 illustrates an exemplary mobile switching center in greater detail according to an advantageous embodiment of the present invention.

FIG. 2 illustrates exemplary mobile switching center 140 in greater detail according to one embodiment of the present invention. MSC 140 includes interconnecting network 200, among other things. Interconnecting network 200 comprises switch fabric 205 and switch controller 210, which together provide switch paths between communication circuits in communication trunk lines 131 and 132. MSC 140 provides services and coordination between the subscribers in wireless network 100 and external networks, such as the PSTN or the Internet. Mobile switching centers similar to MSC 140 are well known to those skilled in the art.

When a wireless network subscriber turns on his or her mobile station (e.g., cell phone) or fixed access terminal, radio messages over the air interface inform the base station that the mobile station (or fixed access terminal) is joining the network. However, a connection is not made automatically to voice or data traffic carrying circuits in trunk lines 131-132. A voice or data traffic connection to the public switched telephone network (PSTN) or the Internet is not needed until the subscriber places a call (e.g., dials a phone number) or accesses the Internet.

However, even when the phone is idle, certain information about the subscriber (i.e., subscriber data) must be retrieved and stored in either the base station or in MSC 140, or both, in order to authenticate the subscriber, gather billing information, identify the services available to the subscriber, determine capabilities of the mobile station, and the like. The control signals (as opposed to voice and data traffic) required to do this are also carried over communication trunk lines 131 and 132. After the subscriber data is stored in memory in MSC 140, it is available for use by a variety of call processing client (CPC) applications that may be initiated by the subscriber or another device while the mobile station is still active.

For example, when MS 111 is first turned ON, a call process is set up in MSC 140 for MS 111 and subscriber data (e.g., billing information) is stored in MSC 140 that may be accessed by the call process or other call applications that provide particular types of call services. If the subscriber dials a phone number on MS 111 or a call is received from the PSTN directed to MS 111, the call process for MS 111 handles the establishment of a call connection on one of the trunk lines in communication trunk lines 131 and one of the trunk lines in communication trunk lines 132. The MS 111 call process executed in MSC 140 maintains all state information related to the call and to MS 111 and handles all other applications required by MS 111, including three-way calls, voice mail, call disconnection, and the like.

In order to handle a large amount of call traffic, it is necessary to distribute the many active call processes and call service applications handled by MSC 140 across a number of call application nodes (CANs). The call services may include applications for accessing a subscriber database, selecting (or de-selecting) communication trunk lines, retrieving and maintaining call identity information, and the like. The present invention provides an apparatus and method for the online updating of software in MSC 140 while MSC 140 is distributing call processes and call service applications across multiple call application nodes. In one advantageous embodiment, MSC 140 comprises a distributed network of redundant servers in which call traffic is distributed in order to increase the call-handling capacity of MSC 140. The redundancy of the distributed servers is transparent to both the call process client applications that require a service and the call process server applications that provide the service. The redundancy of the distributed servers also decreases the complexity of both the client and server applications.

Figure 3:
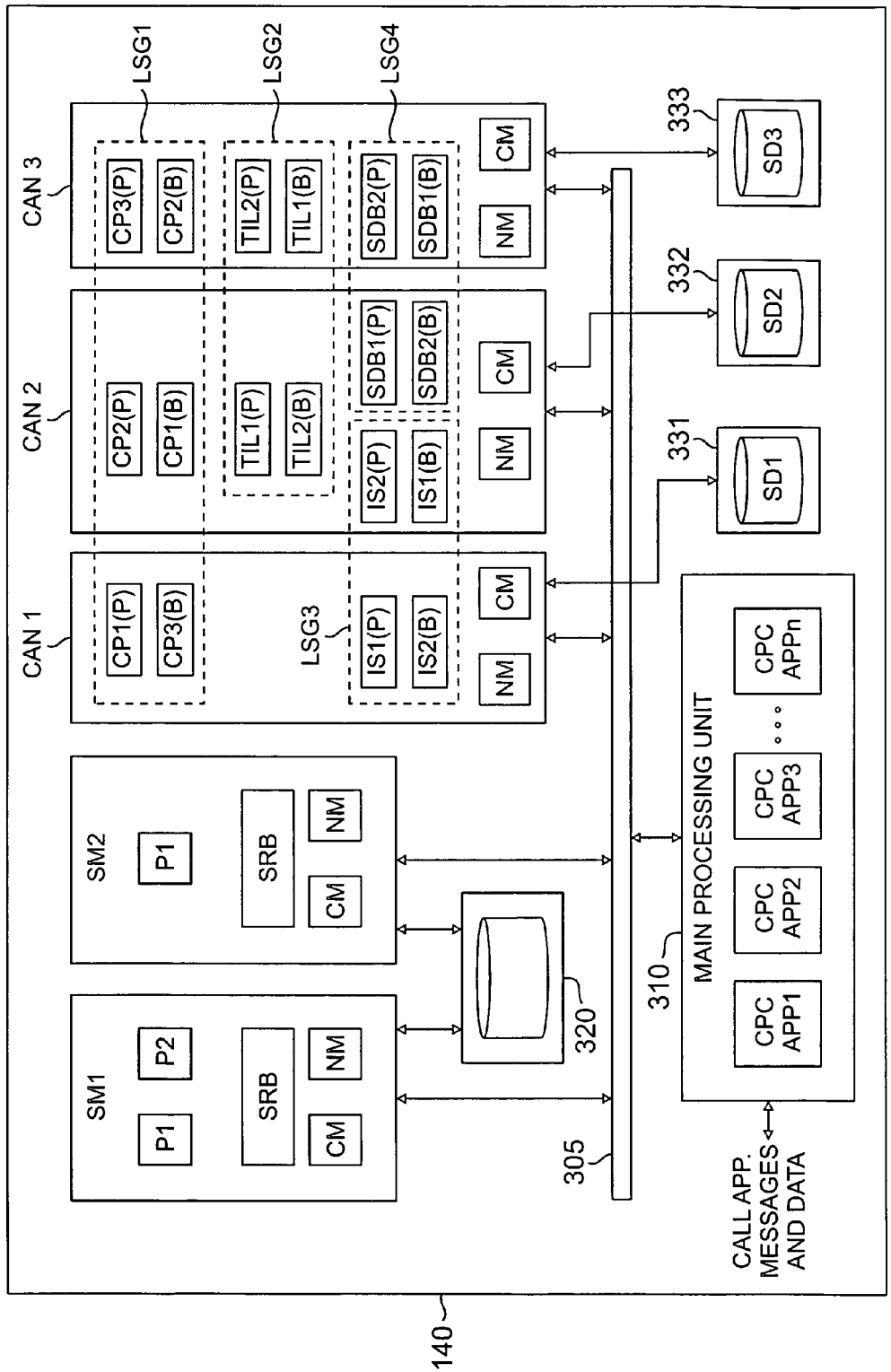
FIG. 3 illustrates selected portions of the mobile switching center in FIG. 2 that perform a software upgrade for a distributed call processing method using group services according is to the principles of the present invention.

FIG. 3 illustrates in greater detail selected portions of exemplary mobile switching center 140 that performs an online software upgrade for a distributed call processing system in accordance with the principles of the present invention. MSC 140 comprises main processing unit (MPU) 310, system manager node 1 (SM1), system manager node 2 (SM2), and master database 320. MSC 140 also comprises a plurality of call application nodes (CANs), including CAN 1, CAN 2, and CAN 3, and a plurality of local storage devices (SDs), namely SD1, SD2, and SD3, that are associated with CAN 1, CAN 2 and CAN 3. The use of three call application nodes (CANs) is shown as an example. Any number N of call application nodes (CANs) may be used. Master database 320 may be used as a master software repository to store databases, software images, server statistics, log-in data, and the like. SD1-SD3 may be used to store local capsules, transient data, and the like. The main processing unit (MPU) 310, and the system manager nodes, SM1 and SM2, and the plurality of call application nodes, CAN 1 to CAN 3, communicate through data bus 305.

In the embodiment shown in FIG. 3, each one of system manager nodes (SM1 and SM2) and each one of the call application nodes (CAN 1 to CAN 3) executes a configuration management (CM) application that sets up each node with the appropriate software and configuration data upon initial start-up or after a reboot. Each node also executes a node monitor (NM) application that loads software and tracks processes to determine if any process has failed. System manager nodes SM1 and SM2 execute a first arbitrary application, P1, and system manager node SM1 also executes a second arbitrary application, P2.

Call application nodes 1 to 3 (CAN 1 to CAN 3) also execute a number of call process (CP) server applications organized as primary and backup processes that are available as distributed group services to 1 to "n" call process client (CPC) applications, namely CPC APP1 to CPC APPn in main processing unit 310. The three (3) call application nodes (e.g., CAN 1-CAN 3) are separate computing nodes comprising a processor and memory that provide scalability and redundancy by the simple addition of more call application nodes.

Each of the "n" call process client (CPC) applications, namely CPC APP1 to CPC APPn in MPU 310, handles the control signals and messages related to a single call associated with a mobile station. Each of CPC APP1 to CPC APPn establishes a session with a load sharing group, which assigns the call to a particular one of the primary-backup group call process server applications, CP1, CP2, or CP3. The selected call process server application actually performs the call process services/functions requested by the call process client application.

In the illustrated embodiment, three exemplary call process server applications are being executed, namely CP1, CP2, and CP3. Each of these processes exists as a primary-backup group. Thus, CP1 exists as a primary process, CP1(P), and a backup process, CP1(B). Similarly, CP2 exists as a primary process, CP2(P), and a backup process, CP2(B), and CP3 exists as a primary process, CP3(P), and a backup process, CP3 (B). In the illustrated embodiment, CP1(P) and CP1(B) reside on different call application nodes (i.e., CAN 1 and CAN 2). This is not a strict requirement. CP1(P) and CP1(B) may reside on the same call application node (e.g., CAN 1) and still provide reliability and redundancy for software failures of the primary process, CP1(P). However, it is preferable that the primary process and the backup process reside on different call application nodes, thereby providing hardware redundancy as well as software redundancy. Thus, CP1(P) and CP1(B) reside on CAN 1 and CAN 2, CP2(P) and CP2(B) reside on CAN 2 and CAN 3, and CP3(P) and CP3(B) reside on CAN 3 and CAN 1.

Together, CP1, CP2 and CP3 form a group for load sharing purposes. Thus, CP1(P) and CP1(B), CP2(P) and CP2(B), and CP3(P) and CP3(B) are part of a first load sharing group (LSG1), indicated by the dotted line boundary. Additionally, CAN 1-CAN 3 host three other load sharing groups, namely, LSG2, LSG3, and LSG4. LSG2 comprises two trunk idle list (TIL) server applications, namely TIL1 and TIL2. TIL1 exists as a primary process, TIL1(P), on CAN 2 and a backup process, TIL1(B), on CAN 3. TIL2 exists as a primary process, TIL2(P), on CAN 3 and a backup process, TIL2(B), on CAN 2. Similarly, LSG3 comprises two identity server (IS) applications, namely IS1 and IS2. IS1 exists as a primary process, IS1(P), on CAN 1 and a backup process, IS1(B), on CAN 2 and IS2 exists as a primary process, IS2(P), on CAN 2 and a backup process, IS2(B), on CAN 1. Finally, LSG4 comprises two subscriber database (SDB) server applications, namely SDB1 and SDB2. SDB1 exists as a primary process, SDB1(P), on CAN 2 and a backup process, SDB1(B), on CAN 3 and SDB2 exists as a primary process, SDB2(P), on CAN 3 and a backup process, SDB2(B), on CAN 2.

A group service provides a framework for organizing a group of distributed software objects in a computing network. Each software object provides a service. In addition, the group service framework provides enhanced behavior for determining group membership, deciding what actions to take in the presence of faults, and controlling unicast, multicast, and groupcast communications between members and clients for the group. A group utilizes a policy to enhance the behavior of the services provided by the group. Some of these policies include primary-backup for high service availability and load sharing for distributing the loading of services within a network.

Call processing server applications, such as CP1-CP3, IS1-IS2, and TIL1-TIL2, located within a computing network provide services that are invoked by client applications, such as CPC APP1 to CPC APPn. As shown in FIG. 3, the call processing server applications are organized into primary-backup groups configured as a "one plus one" (1+1) type of primary-backup group. There are multiple numbers of these primary-backup groups and the exact number is scalable according to the number of processes and/or computing nodes (e.g., CANs) that are used. All of the primary-backup groups are themselves a member of a single load sharing group (e.g., LSG1, LSG2, LSG3, LSG4).

It is important to note that while the call process client applications, CPC APP1 to CPC APPn, are clients with respect to the call process server applications, CP1, CP2, and CP3, a server application may be a client with respect to another server application. In particular, the call process server applications CP1-CP3 may be clients with respect to the trunk idle list server applications, TIL1 and TIL2, the subscriber database server applications, SDB1 and SDB2, and the identity server applications, IS1 and IS2.

A client application establishes an interface to the load sharing group. When a new call indication is received by the client application, the client application establishes a session with the load sharing group according to a client-side load sharing policy. The initial policy is round-robin (i.e., distribution of new calls in sequential order to each CAN), but other policies may be used that take into account the actual loading of the different primary-backup groups.

The client application associates the session with the new call and sends messages associated with the call over the session object. The client application also receives messages from the primary-backup group via the session established with the primary-backup group. Only the primary process (e.g., CP1(P)) of the primary-backup group joins the load sharing group (e.g., LSG1). For a variety of reasons, the application containing the primary may be removed from service. The server application may elect to not accept any new calls by leaving the load sharing group. However, the client applications may still maintain their session with the primary-backup group for existing calls. This action is taken because new call traffic may be lost if the singleton primary also fails. New calls are not distributed to the primary-backup group if it leaves the load sharing group.

If the primary of the primary-backup group that is a member of the load sharing group should fail, the backup member is informed that the primary member has failed (or left) and then assumes the role of primary member. The responsibility for these actions must be performed by the server application. It is the responsibility of the group service to inform the backup member that the primary member has failed or left.

As part of the online software upgrade process, one or more applications containing primary-backup groups may be removed from service, brought down, and then brought back up using a new version of software code. These groups, if their interface has not changed, join the existing load sharing group. When first started, it is required that the client interface be capable of throttling the call traffic to specific primary-backup groups. The traffic throttling is expressed as a percentage varying from zero percent (0%) (no calls) to one hundred percent (100%) (all calls). All new calls that would have been scheduled according to the scheduling algorithm are handled by this session. The throttling factor is initialized to one hundred percent (100%) for any primary-backup group that joins the load sharing group. During on-line software upgrades, the throttling factor is adjusted to start with the "no calls" case for the new software version. Any client application for the load sharing group may establish a session with a specific primary-backup group. The client may then change the throttling factor at any time. When the throttling factor is changed, all client session interfaces receive via multicast the changed throttling factor. As the throttling factor is increased, the call process server applications with the new software version may receive increasing amounts of call traffic.

Call processing communications from the client applications to the call processing server primary-backup groups must support a very high volume of calls. The group software utilizes an internal transport consisting of a multicasting protocol (simple Internet Protocol (IP) multicast) and optionally a unicasting protocol. The unicasting protocol may be TCP/IP, SCTP, or other transport protocol. The multicast protocol is used for internal member communications relating to membership, state changes, and fault detection. In the absence of unicast transport, the multicast protocol is used for client/server communication streams. The unicast protocol, when provided, is used to provide a high-speed stream between clients and servers. The stream is always directed to the primary of a primary-backup group, which is transparent to both the call processing client application and the call process (e.g., CP1, CP2, CP3, TIL1, TIL2, IS1, IS2).

As noted above, the call processes on the call application nodes (CANS) are organized into a load sharing group. Each call process (e.g., CP1, CP2, CP3, TIL1, TIL2, IS1, IS2) is itself a primary-backup group. Both members of the primary-backup group may provide the service but only the primary of the group receives messages and thus actually provides the service. When a member of the group is selected as the primary, it registers one or more interface streams for the group. Each stream is a separate interface for some call processing service.

The call processing client application (e.g., CPC APP1, CPC APP2) in MSC 140 receives a new call indication and uses the group service to select an interface with a call application node (i.e., server) to handle the new call. The call process on each server (i.e., CAN) is a member of a load sharing group and a particular call application node (CAN) is selected using a round-robin algorithm from the perspective of the call process client application. For the particular primary-backup group that is selected a session is returned to the call processing client application. When the session is established with the primary-backup call process server group, the call processing client application then opens an interface to a particular member (representing an interface to a primary-backup group) and obtains a session interface. Each call processing server sends a message related to the new call over the session interface. Any subsequent transactions associated with the call are sent over the same session object.

The call process server (i.e., primary-backup group) may asynchronously send messages over the session using one or more of the defined stream interfaces. The primary member of the call processing server group receives the transactions. The backup group member does not receive transactions. The primary group member sends updates to the backup group member. The primary group member decides when updates are sent to the backup group member. The primary starts sending updates when a call has been answered. Prior to the call being answered, the call is defined as being a transient call. After the call has been answered, the call is defined as being a stable call.

If the primary group member should fail, then the backup group member becomes the new primary member. All transient call information during the fail-over period (the time between when the primary fails and the backup is changed to be the new primary) can be lost. All stable call information must be maintained by the backup. However, some stable call information may be lost if the backup has not received updates.

New call application nodes (CANs) and additional primary-backup group server applications (e.g., CP1, CP2, CP3, TILL, TIL2, IS1, IS2) may be added dynamically to the load sharing groups and can start servicing new call traffic. Call process client applications are not affected by the additions of new servers. If a server should fail, its backup assumes responsibility for the load. This provides high availability for the servicing of each call and minimizes dropped calls.

Figure 4:
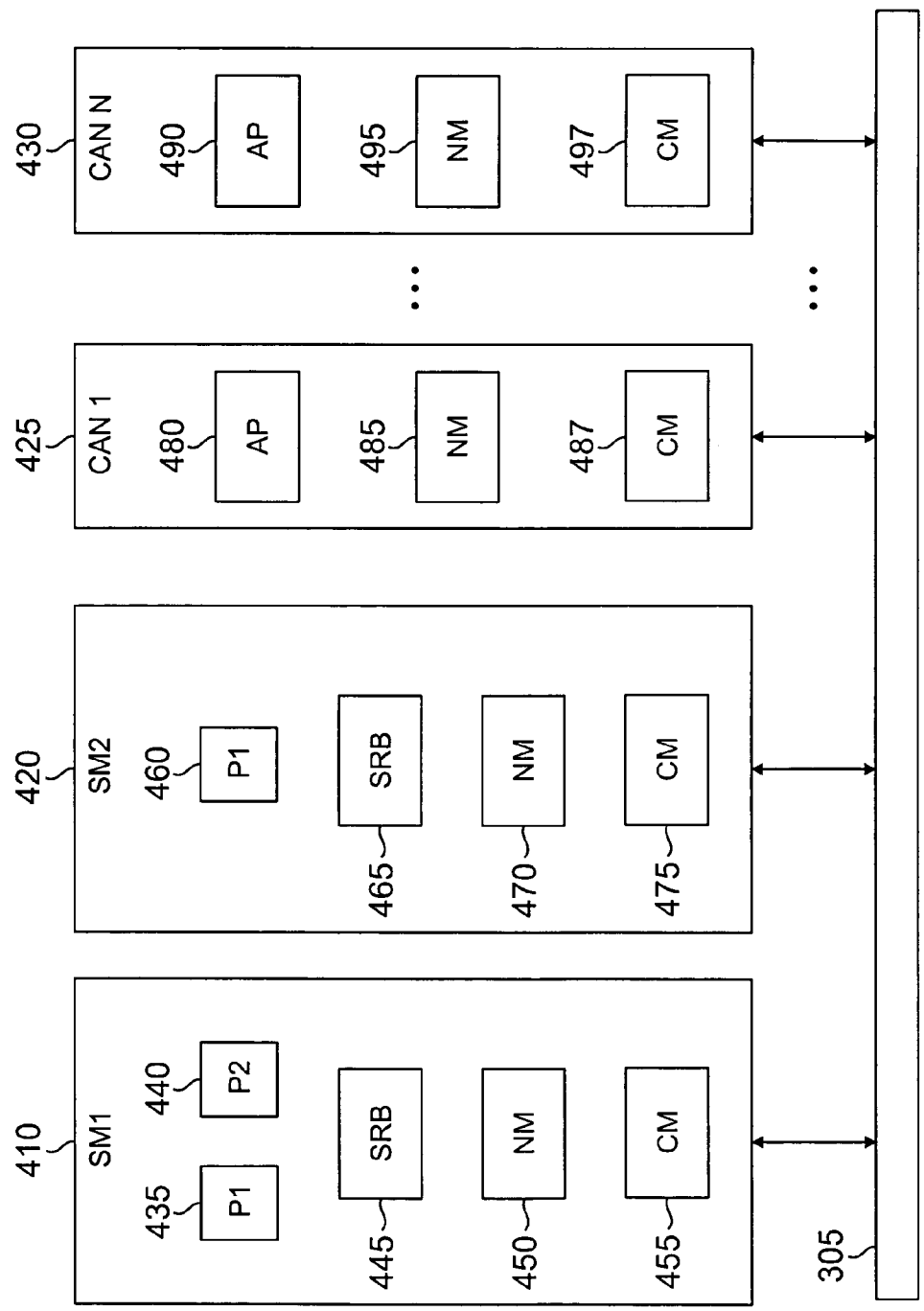
FIG. 4 illustrates in greater detail selected portions of the mobile switching center shown in FIG. 3 according to the principles of the present invention.

FIG. 4 illustrates in more detail selected portions of the mobile switching center (MSC) 140. FIG. 4 illustrates system manager node 1 (SM1) 410, system manager node 2 (SM2) 420, first call application node CAN 1 425, and $N^{th}$ call application node CAN N 430. The ellipsis between CAN 1 425 and CAN N 430 denotes the existence of a plurality of N call application nodes (CAN 1 to CAN N).

As previously mentioned, system manager node 1 (SM1) 410 comprises a first arbitrary application, P1 435, and a second arbitrary application, P2 440. SM1 410 also comprises a Node Monitor (NM) application 450 and Configuration Management (CM) application 455. SM1 410 also comprises a naming service application that is referred to as a System Request Broker (SRB) 445. The operation of SRB 445 will be more fully described below.

Similarly, system manager node 2 (SM2) 420 comprises a first arbitrary application, P1 460, a Node Monitor (NM) application 470 and Configuration Management (CM) application 475. SM2 420 also comprises a System Request Broker (SRB) 465.

Call application node CAN 1 425 comprises software applications 480, Node Monitor (NM) application 485, and Configuration Management (CM) application 487. Call application node CAN N 430 comprises software applications 490, Node Monitor (NM) application 495, and Configuration Management (CM) application 497. Software applications 480 in CAN 1 425 and software applications 490 in CAN N 430 comprise the primary-backup group server applications (CP1, CP2, CP3, TIL1, TIL2, IS1, IS2) previously described with reference to FIG. 3.

In each of the system manager nodes, SM1 and SM2, and in each of the call application nodes (CANs), the Configuration Management (CM) applications comprise a Configuration Management (CM) controller that is capable of executing an online software upgrade for software in the mobile switching center (MSC) 140. As will be more fully described, the Configuration Management (CM) applications upgrade the software while the mobile switching center (MSC) 140 is executing the software to handle call traffic.

In each of the system manager nodes, SM1 and SM2, and in each of the call application nodes, CAN 1 to CAN N, the Node Monitor (NM) application is a generic loader application. The Node Monitor provides an interface that is called the Node Management Interface (NMI). The Node Monitor loads and unloads software applications into a node through the Node Management Interface. The Node Monitor also obtains status information about the software applications through the Node Management Interface. For example, NM 450 is capable of loading or unloading software applications into system manager node SM1 410. NM 450 is also capable of obtaining the status of any software application that has been loaded into system manager node. SM1 410.

The Node Monitor in each node is capable of establishing an Event Channel. An Event Channel is a connectionless multicast channel over which all Node Monitor events are reported. The Node Monitor uses the Event Channel to report events such as application loading, application failure, node start events, and node failure events. The Node Monitor monitors all loaded applications and reports when the loaded applications exit or when they fail. Each Node Monitor also monitors all other Node Monitors that may be loaded into other nodes of MSC 140. If there is a failure of a Node Monitor in any node of MSC 140, all of the other Node Monitors will report the node failure.

In each of the system manager nodes, SM1 and SM2, the System Request Broker (SRB) is a naming service application. The SRB application is only loaded into system manager nodes. In the exemplary embodiment shown in FIG. 4, SRB 445 is loaded into SM1 410 and SRB 465 is loaded into SM2 420. The SRB naming service enables each server application to register its service. This feature allows a client to associate a public name with a service definition. Typically the service definition minimally contains the address of the service and how to construct a protocol stack that is provided by that service. Client applications use the service name to locate the service definition.

After the client application has obtained the service definition, a protocol stack with the proper address is constructed for the client application. The client application may then communicate with the server application. Generally both the server application and the client applications use group services. The group services appear in the form of a protocol stack. Servers and clients both only have to know the service name. Server applications also define the service type which defines the type of group that is used along with its associated transport.

An online software upgrade system of the present invention is initialized when a Node Monitor application is started within a system manager (SM) node. First, the Node Monitor loads an SRB application into the system manager (SM) node. Generally two system management nodes (SM1 and SM2) are provided for redundancy. That is, Node Monitor 450 loads SRB 445 into SM1 410 and Node Monitor 470 loads SRB 465 into SM2 420.

Consider SRB 445 within system management node SM1 410. SRB 445 in system management node SM1 410 is the Primary in a primary-backup group. The other SRB 465 in system management node SM2 420 is a Backup in the same primary-backup group. All applications, including the Node Monitors, use an SRB application to define their services. The SRB application performs address assignments and association with the named service. Clients for those services use the SRB application to locate a named service and receive the address and stack description from the SRB application. The client can then establish a direct interface with the application providing that service.

The service definitions are stored in both the Primary SRB and in the Backup SRB. The Primary SRB sends a backup copy of the service definitions to the Backup SRB. Name Resolution Updates are also stored in the Backup SRB. If the Primary SRB should fail for any reason, then the Backup SRB can take over without loss of any of the service definitions.

The online software upgrade system of the present invention introduces a new software load for the various software components in the system of MSC 140 while the system is still actively running. This is accomplished by partitioning the SRB address space into two partitions. The first partition of the SRB address space is the current partition (referred to as the Reference Partition) and the second partition of the SRB address space is the new partition (referred to as the New Partition).

Figure 5:
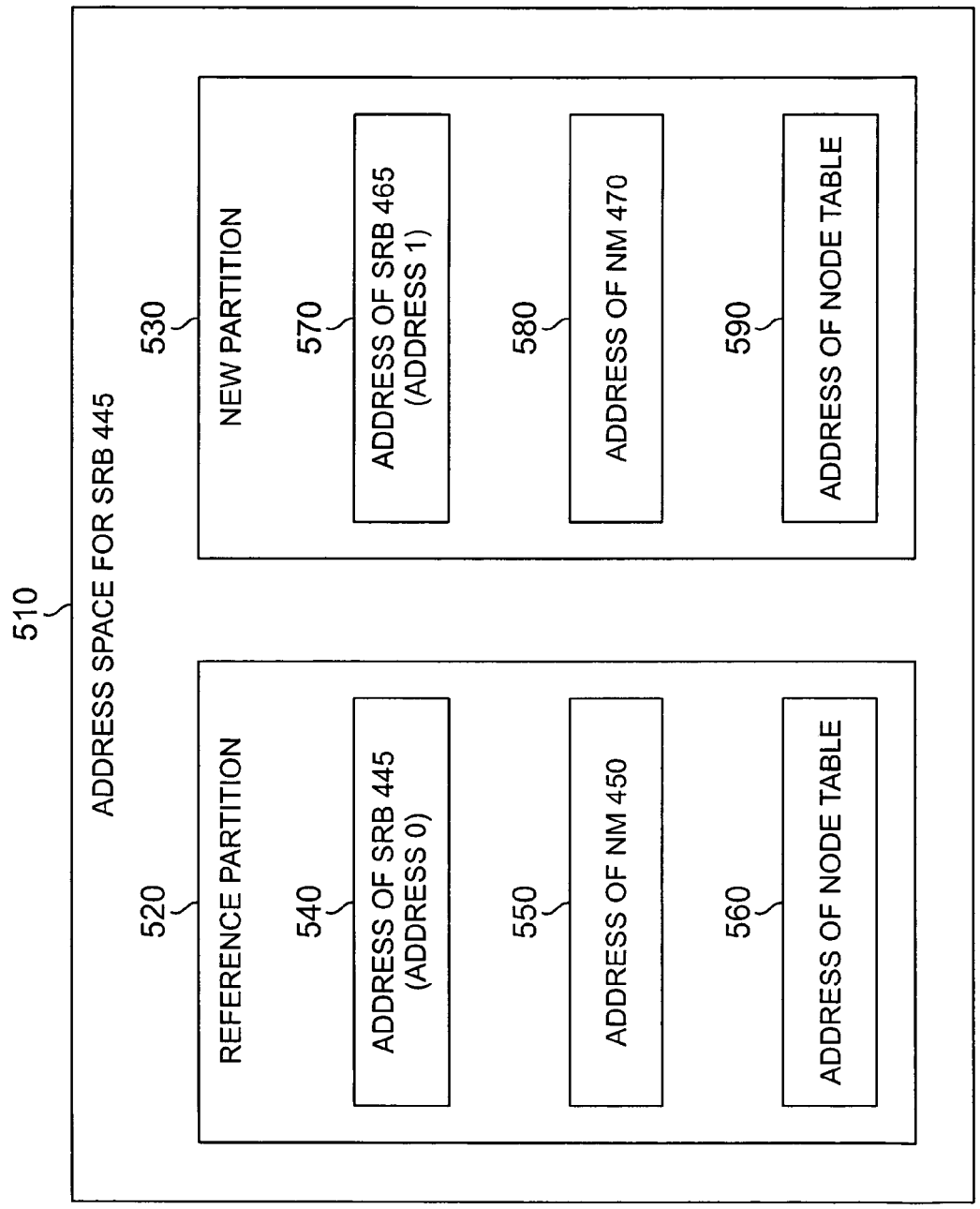
FIG. 5 illustrates an address space for a system request broker (SRB) located within a system management node according to the principles of the present invention.

An exemplary partition of the address space 510 for SRB 445 is shown in FIG. 5. Address space 510 comprises Reference Partition 520 and New Partition 530. Reference Partition 520 comprises an address 540 (also denoted "Address 0") of SRB 445, an address 550 of Node Monitor 450, and an address 560 of a Node Table (described more fully below). New Partition 530 comprises an address 570 (also denoted "Address 1") of SRB 465, an address 580 of Node Monitor 470, and an address 590 of a Node Table (described more fully below).

To perform the online software upgrade of the present invention, Configuration Management (CM) application 455 of system management node SM1 410 partitions SRB address space 510 into Reference Partition 520 and New Partition 530. CM application 455 selects a backup system management node (e.g., SM2 420) and an additional set of other application nodes (e.g., CAN 2 and CAN 3) to take the new software load. CM application 455 then sends signals to cause the Node Monitor in each of the newly selected nodes (e.g., SM2 240, CAN 2 and CAN 3) to shut down the nodes. CM application 455 then sends signals to cause the Node Monitor in each of the newly selected nodes to install the new software. CM application 455 then assigns the New Partition 530 a new SRB address 570 that is different than the SRB address 540 in the Reference Partition 520. CM application 455 then starts the system management node SM2 420 in New Partition 530 with the new SRB address 570.

SRB 445 in the Reference Partition 520 remains as a single member Primary in a primary-backup group. SRB 465 in the New Partition 530 becomes a single member Primary in a primary-backup group. SRB 445 in the Reference Partition 520 only handles naming service requests for the Reference Partition 520. Similarly, SRB 465 in the New Partition 530 only handles naming service requests for the New Partition 530. There is one exception to this feature that will be discussed more fully below.

The new software in the New Partition 530 is loaded through each Node Monitor located in each New Partition node. CM application 455 then tests the newly loaded software. If the newly loaded software passes the test, each node in the Reference Partition 520 is shut down, the new software is installed in the New Partition 530, the SRB address is changed for the New Partition nodes, and the New Partition nodes are restarted. This process continues until all the nodes have been upgraded with the new software.

If the newly loaded software does not pass the test, each node in the New Partition 530 is shut down, the previous version of the software is then used, the SRB address is changed back to the Reference Partition address, and the Reference Partition nodes are restarted.

Prior art implementations of this approach required that the applications be aware of which partition in which they were located or required that the applications make some other adjustments to the online software upgrade process. The present invention differs from the prior art by making the online software upgrade process transparent to all applications except for the CM, SRB, and NM applications that control the online software upgrade process.

As previously mentioned, a group service provides a framework for organizing a group of distributed software objects in a computing network. Each software object provides a service. In addition, the group service framework provides enhanced behavior for determining group membership, what actions to take in the presence of faults, controlling unicast, multicast, and groupcast communications between members and clients for the group. A group utilizes a policy to enhance the behavior of the services provided by the group. Some of these policies include primary-backup for high service availability and load sharing for distributing the loading of services within a network.

Group service supports the concept of a "super group." A super group is a group whose individual members are also groups. Typically the members of a super group are the primary members of primary-backup groups. One novel and unique feature of the present invention is the use of super groups to provide transparency to applications during the online software upgrade process. The super group is permitted to span partition boundaries so that its address is known in both the Reference Partition and the New Partition. The sub-groups which are members of the super group reside in either the Reference Partition or the New partition. The super group is used by applications to locate members for services. This permits both external entities (i.e., entities that are external to the online upgrade process) and internal entities to utilize services without interruption during the online software upgrade process.

A description of this process and how the SRB application and NM application cooperate in this process will now be given. The SRB application comprises a data structure called the Node Table that contains the address used by the Reference Partition, the address used by the New Partition, and the list of nodes that are in the New Partition. If a node is not in the New Partition it must be assumed that the node is in the Reference partition. The Configuration Management (CM) application enters the contents of the Node Table during the initialization of the online software upgrade process.

Figure 6:
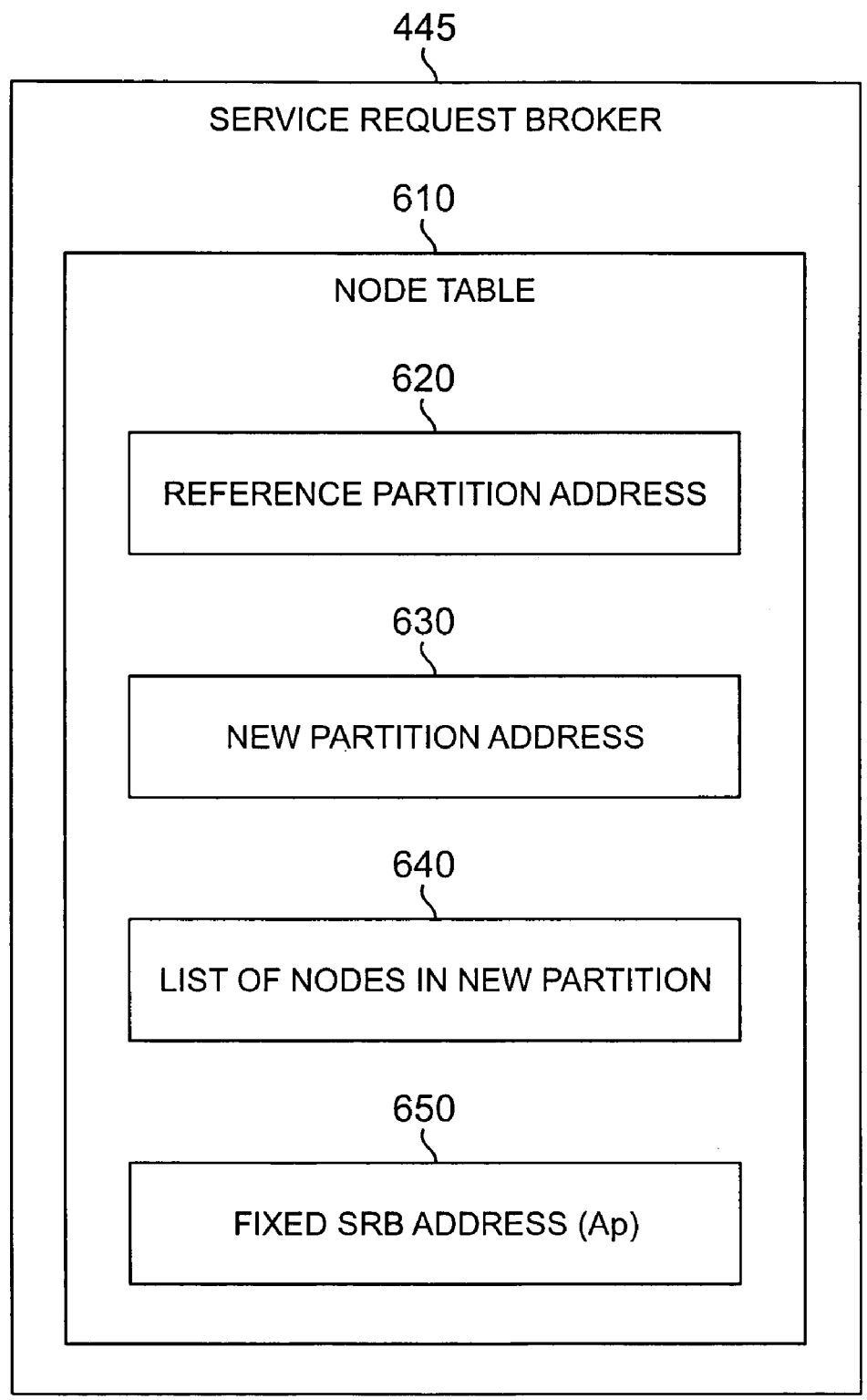
FIG. 6 illustrates a node table within a system request broker (SRB) according to the principles of the present invention.

FIG. 6 illustrates exemplary Node Table 610 located within Service Request Broker (SRB) 445. Node Table 610 comprises the Reference Partition address 620, New Partition address 630, and a list of nodes that are located within the New Partition 640. Node Table 610 also comprises a fixed SRB address 650 (denoted "Ap"). For convenience in describing the operation of the present invention, the Reference Partition address 620 may initially be denoted as an "Am" address and the New Partition address 630 may initially be denoted as an "An" address. As will be more fully described, the "Am" address and the "An" address will exchange places during the operation of each cycle of the online software upgrade process.

Assume that at the beginning of the online software upgrade process, the Reference Partition address is denoted as an "Am" address and the New Partition address is denoted as an "An" address. After the first online software upgrade for the system, the Reference Partition address is denoted as an "An" address. After the second online upgrade for the system, the New Partition address is denoted as an "Am" address. The "Am" and "An" addresses exchange places (i.e., cycle) with each new software load.

Each Node Monitor (NM) initially queries the Node Table in the SRB (e.g., Node Table 610 in SRB 445) to determine what address to use. Each Node Monitor initially uses a fixed SRB address "Ap" (e.g. fixed SRB address 650) to communicate with the SRB. The Node Monitor may communicate with any SRB using the fixed SRB address "Ap" regardless of the partition location. The Node Table is accessable (i.e., shared) across both the Reference Partition and the New Partition.

The Node Monitor in any node is automatically started with the fixed SRB "Ap" address as an input parameter. The Node Monitor attempts to contact any SRB that is reachable through the fixed SRB "Ap" address. If an SRB cannot be found, then the Node Monitor loads an SRB using the "Ap" address as an input parameter. When the Node Monitor is able to contact an SRB, the Node Monitor requests the address for the node (either the "Am" address or the "An" address) that the Node Monitor and all of its loaded applications should be using. The Node Monitor then loads a local SRB if it has not already done so (using either the "Am" address or the "An" address). When the Node Monitor loads applications into its node, the Node Monitor tells each loaded application what SRB address to use (either the "Am" address or the "An" address based upon the original SRB communication). This is the extent of the actions that are required of the Node Monitor program in support of the online software upgrade process of the present invention.

The SRB (e.g., SRB 445) comprises an SRBServerMain program (referred to as the "SRBServerMain"). The SRBServerMain is started using the following command:

SRBServerMain Ap [Am|An], where [ ] denotes an optional argument and the vertical line | denotes "or". The SRBServerMain program persistent database has a data structure called the System Address Field that contains the following data elements:

Am—IP multicast address m.
An—IP multicast address n.
Partition Address Index—(0 or 1) indicating either an "m" or an "n" address for this partition.

The SRBServerMain creates two group server interfaces (the partition independent interface and the partition interface):

The first interface uses the multicast address "Ap". This address is the partition independent address through which the Node Monitor in each node can obtain its partition address.

The second interface is created using the assigned partition multicast address, either the Am address or the An address.

If SRBServerMain is started with the optional address argument (either the Am address or the An address), then SRBServerMain uses that address for the second interface. SRBServerMain then edits its local SRB System Address Field Partition Address Index to correspond to the input address argument. If the input address does not match one of the addresses in the System Address Field, then SRBServerMain outputs an error to the system log. If there is no local SRB System Address Field, then SRBServerMain outputs an error to the system log. SRBServerMain still establishes its interface using the input address argument.

If the SRBServerMain is not started using the optional address argument, then SRBServerMain reads the local SRB System Address Field and selects the address referenced by the Partition Address Index. If there is no SRB System Address Field, then SRBServerMain outputs an error to the system log and does not establish the second interface.

SRBServerMain normally runs in a duplex mode with one SRB being the Primary in a primary-backup group. When the second SRB initializes, it is the responsibility of the Primary SRB to equalize the state of the Primary with that of the Backup. The SRB System Address Field contents for the Backup SRB are equalized with that of the Primary SRB to avoid address inconsistencies.

The SRB defines the Node Table and provides an application programming interface (API) to set and retrieve the Node Table data. As previously mentioned, the Node Table contains:

The Reference Partition address (either Am or An);
The New Partition Address (either Am or An where the Reference Partition address and the New Partition address are different); and
The list of node names in the New Partition.

The Configuration Management (CM) application controls which nodes are in the New Partition when the online software upgrade process is initiated. When a node is selected to migrate to the New Partition, the New Partition node is shut down, the new software is installed in the New Partition node, and the name of the New Partition node is added to the list of nodes in the New Partition. When the New Partition node is started, the Node Monitor will initalize the node as previously described, and will load the new version of software using the New Partition SRB address.

Before the online software upgrade process of the present invention is initiated, an SRB initializes its operation by initializing its Node Table if it not already set to the values obtained from the local SRB System Address Field. The SRB then sets the Reference Partition Address to the value of the address referenced by the Partition Address Index. The SRB then sets the New Partition Address to the value of the other address. The SRB then sets the list of node names in the New Partition to empty (i.e., no names in the list). If the SRB is selected to operate as a Backup SRB, the Primary SRB updates its SRB System Address Field and the Backup SRB overwrites its local SRB System Address Field with the update value. The Backup SRB also receives the Node Table and updates its local version of the Node Table.

When the online software upgrade process of the present invention is initiated, the backup system manager (e.g., SMs) and a subset of call application nodes (CANs) are shutdown. (For purposes of description, the SM in the Reference Partition is denoted SM1 and the SM in the New Partition is denoted SM2). The Configuration Management (CM) application sets the Node Table is within the one instance of SRB running locally. The Configuration Management (CM) application then adds the shutdown nodes to the New Partition list.

The user (i.e., technician) then loads the new version of software onto the shutdown nodes. The Configuration Management (CM) application then starts SM2 in the New Partition. This starts the Node Manager application. The Node Manager attempts to contact any SRB using the Ap address. For example, the Node Manager contacts the SRB in SM1. Assume that the Reference Partition address is an An address and the New Partition address is an Am address. The Node Monitor queries the SRB to find out what address to use for SM2.

In this exemple, the SRB returns the Am address. The Node Monitor then loads a local SRB and tells the local SRB to use the Ap address and the Am address. All subsequent applications that are loaded by the Node Monitor of SM2 are told to use the Am address. All name associations are defined to this local SRB. The SRB in SM1 is not visible to any applications running in SM2. Even though the applications may define the same named services as in SM1, because the address spaces are different the applications are not accessible between the two partitions.

There is one exception to this general rule. The SRB in the Reference Partition and the SRB in the New Partition share service definitions. They also share the Node Table and any other resourcs that must be shared across the boundary of the two partitions. This includes super group service definitions which must span both of the partitions.

When an call application node (e.g., CAN 2) is brought up in the New Partition, it starts a local Node Monitor. Assume that call application node 1 (CAN 1) is the Reference Partition. The Node Monitor in the New Partition uses the Ap address to contact an SRB. The SRB will either be the SRB in SM1 or the SRB in SM2. Because the Node Table is the same in both partitions, it does not matter which SRB is used. The Node Monitor then requests the partition address that it should use giving the node name of CAN 2. The SRB returns an Am address which is the address used in the New Partition. All applications then loaded into the New Partition node CAN2 will then use the Am address to define and locate services. Similar actions occur for any additional application nodes that are started in the New Partition.

The user (i.e., technician) then tests the newly loaded software in the New Partition. If the test is successful, then nodes in the Reference Partition may be moved forward by shutting them down, updating the SRB Node Table, loading the new software in the New Partition node, and then restarting the New Partition node. If the test is not successful, then any node may be migrated back to the Reference Partition by first shutting down the New Partition node, removing it from the SRB Node Table, restoring the original software load to the Reference Partition node, and then restarting the Reference Partition node.

During the process of the online software upgrade it is desirable to make the transition as transparent as possible to the majority of applications. For many services the online software upgrade process as previously described is sufficient to provide transparency. Unfortunately, a set of services exists that must be utilized from both partitions. Typically these services include load sharing services that must be accessed by external entities either through a firewall (or through some other means), shared distributed resources, and shared resources handled by centralized servers.

To solve the problem of transparency for services that must be provided across partition boundaries, the super group concept is utilized. The super group definition itself is shared between both partitions. This provides the ability to locate actual servers in either partition on the basis of some selection criteria. This can include load sharing (least loaded, least memory used, etc.), which server has a particular resource that needs to be obtained, and so forth. The actual partition in which the application is located is transparent to the application. This feature enables an application (1) to remain unaware of the partition in which the application is located, and (2) to remain unaware of the partition in which a service the application is using is located.

The members of a super group have the name of the primary-backup group which may reside in either of the two partitions. During the online software upgrade process it is not uncommon for members to have the same group name because both reflect two different versions of the same application code and configuration. When such a member name server is selected by the group service for use by a super group client, the group service uses the member name and the SRB to locate the service definition. To distinguish the two groups, group adaptors are provided by the group service. A group adaptor modifies the group name by adding a suffix that identifies the partition in which the group resides. When a group name is passed to an SRB, regardless of which partition the group resides in, the SRB looks at the suffix. If the suffix matches the SRB, then the SRB defines or locates the service locally. If the suffix does not match, then the SRB passes the request onto another SRB for name definition or name resolution. This mechanism hides the partition location for shared resources and permits clients of those services to be partition unaware.

Figure 7:
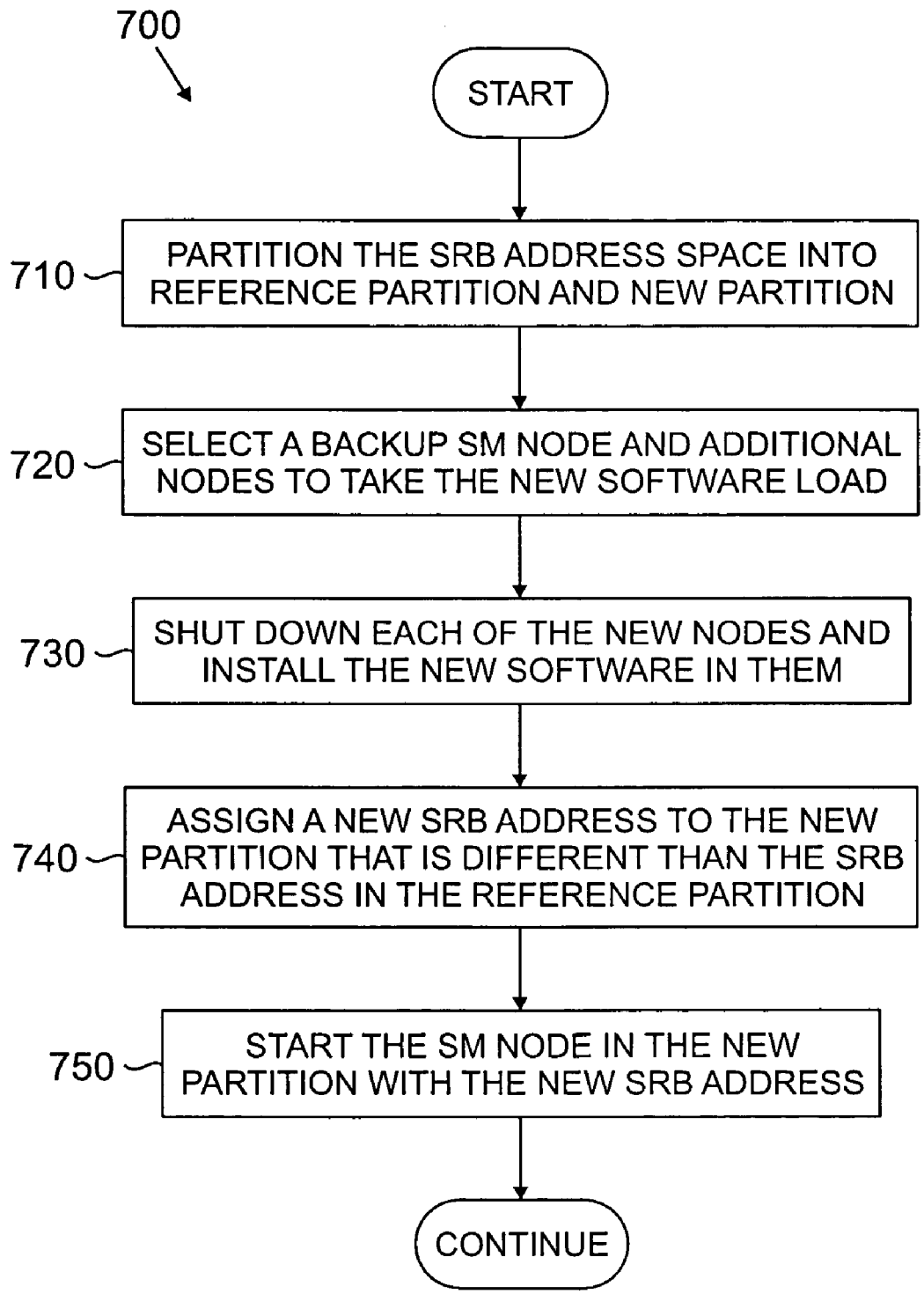
FIG. 7 illustrates a flow chart showing the operation of a first portion of an advantageous embodiment of the method of the present invention.

FIG. 7 illustrates a flow chart showing the operation of a first portion of an advantageous embodiment of the method of the present invention. The steps of the first portion of the method shown in FIG. 7 are generally denoted with reference numeral 700. In the first step of the method Configuration Management (CM) application 455 of system management node SM1 410 partitions the SRB address space 510 into a Reference Partition 520 and a New Partition 530 (step 710). CM application 455 then selects a backup system management node (e.g., SM2 420) and additional nodes (e.g., CAN 2 and CAN 3) to take the new software load (step 720). CM application 455 then sends signals to cause the Node Monitor in each of the newly selected nodes (e.g., SM2, CAN 2 and CAN 3) to shut down each of the nodes and install the new software in them (step 730).

CM application 455 then instigates the assignment of a new SRB address 570 to New Partition 530 that is different than the SRB address 540 in the Reference Partition 520 (step 740). CM application 650 then starts the system management node SM2 420 in the New Partition 530 with the new SRB address 570 (step 750). Control then passes to step 810 of FIG. 8.

Figure 8:
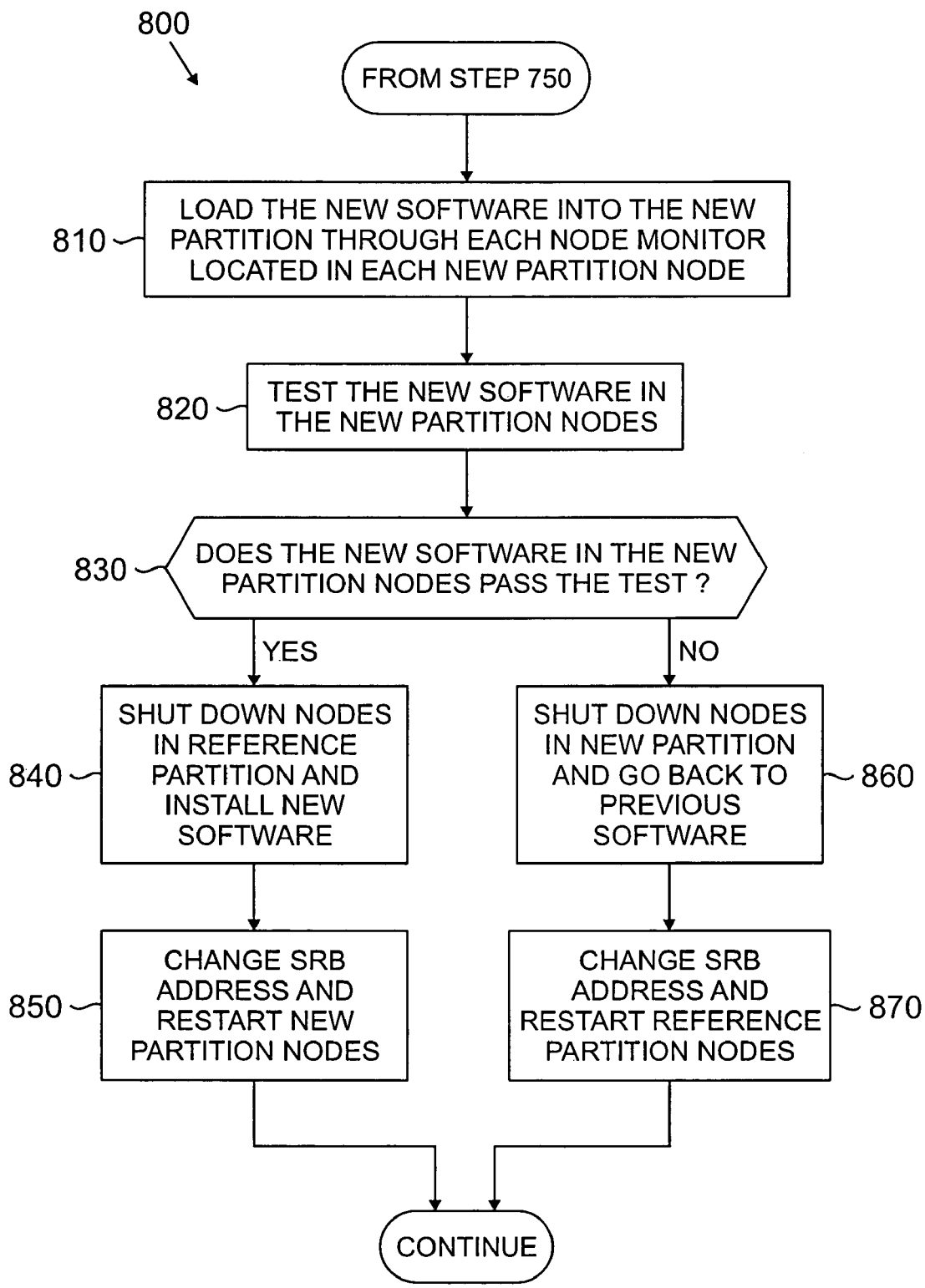
FIG. 8 illustrates a flow chart showing the operation of a second portion of an advantageous embodiment of the method of the present invention.

FIG. 8 illustrates a flow chart showing the operation of a second portion of an advantageous embodiment of the method of the present invention. The steps of the second portion of the method shown in FIG. 8 are generally denoted with reference numeral 800.

Control passes from step 750 of the method as shown in FIG. 7. The new software is then loaded into the New Partition 530 through each Node Monitor located in each New Partition node (step 810). CM application 455 then tests the newly loaded software (step 820). CM application 455 then determines whether the newly loaded software in the New Partition 530 passes the test (decision step 830). If the newly loaded software passes the test, then each node in the Reference Partition 520 is shut down and the software is installed in the New Partition 530 (step 840). The SRB address changes for the New Partition nodes and the New Partition nodes are restarted (step 850). This process continues until all the nodes have been upgraded with the new software.

If the newly loaded software does not pass the test, then each node in the New Partition 530 is shut down and the previous version of the software is then used (step 860). The SRB address changes back to the Reference Partition address and the Reference Partition nodes are restarted (step 870). The process then continues.

A major advantage of the online software upgrade process of the present invention is that the knowledge about the online upgrade process is restricted to a very small area. The only areas of the mobile switching center (MSC) 140 that have to have knowledge about the online software upgrade process are: (1) the Node Monitor application, (2) the SRB naming service application, (3) group naming modification for super group adaptors in the group service, and (4) the Configuration Management (CM) application that controls the online software upgrade process. The use of super groups handles the problems asociated with resources that must be shared across both of the two partitions. The use of super groups also handles problems associated with external interfaces being able to access services during the online upgrade process.

A resource group is a super group used to provide transparent access to a set of distributed resource servers. A resource group facilitates software upgrades for distributed resource servers. Distributed resource servers control resources and are distributed to provide a scalable system that can grow to any size. Typically, resource servers are in a primary-backup configuration in order to provide high availability.

Performing an online software upgrade for a set of distributed resource servers presents problems because the servers may reside in the New partition or the Reference partition, but must be accessible by clients located in either partition. Clients in both partitions must be able to access the resource server in either partition. This makes it difficult to upgrade the distributed server software. The present invention provides a solution to this problem.

At the start of a software upgrade process, a set of distributed resource servers reside in a computing network. Frequently, the resource servers reside in different computing nodes (e.g., CAN1, CAN2, etc.). In addition, each resource server has a backup that resides in a different node from the primary. The primary in each primary-backup pair joins a resource group. The resource group elects a leader. The leader application determines which resources must be managed. The leader then makes resource assignments to the resource servers that have joined the resource group.

Over time, client applications connect to the resource group. Client applications do not know the number of resource servers and do not know which resource servers handle which resource. The client side policy is updated with a map of resource identities associated with the resource server interfaces. Client applications allocate resources by specifying a resource identity and release them in the same manner.

The upgrade process works as follows. A backup system manager (SM) node and an additional set of other nodes are selected to take the new software load. Each of these nodes is shut down and the new software load is installed. The New partition is assigned a new SRB address that is different from the Reference partition address. The SM node in the New partition is started with the new address. The SRB in the Reference partition remains as a single member primary in a primary-backup group. The SRB in the New partition becomes a single member primary in a primary-backup group. The SRB in the Reference partition only handles naming service requests for the Reference partition. Similarly, the SRB in the New partition only handles naming service requests for the New partition.

The new software in the New partition is loaded through each NM located in each New partition node. The new load is tested. If the new load passes the test, each node in the Reference partition is shutdown, the new software is installed, the SRB address is changed for the node, and the node is restarted. This process continues until all nodes are converted. If the new load does not pass the test, each node in the New partition is shutdown, the software is returned to the previous version, the SRB address is changed back to the Reference partition address, and the node is restarted.

Special groups are defined that span both the Reference and New partitions. These groups permit external entities to address a group transparently during a software upgrade. A Resource Group is such a group. Initially, all resource servers reside in the Reference partition. To upgrade the server application software, selected computing nodes containing server applications are shutdown. The new software is loaded onto the computing nodes and the nodes are brought up in the New partition. Although the Reference partition and the New partition have separate address spaces, the Resource Group itself is accessible from either partition.

Figure 9:
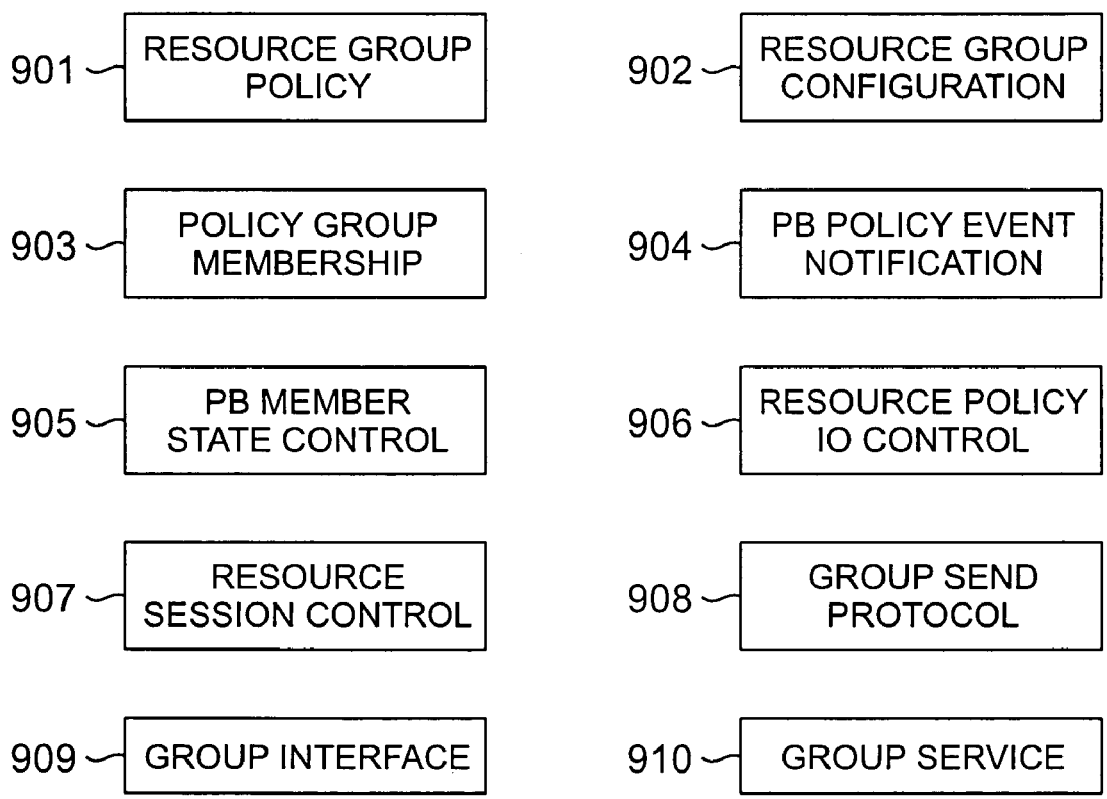
FIG. 9 illustrates exemplary software objects in a server-side group architecture according to an embodiment of the present invention.

FIG. 9 is an illustration of exemplary software objects in a server-side group architecture according to an embodiment of the present invention. The software objects comprise: Resource Group Policy object 901, Resource Group Configuration object 902, Policy Group Membership object 903, PB Policy Event Notification object 904, PB Member State Control object 905, Resource Policy IO Control object 906, Resource Session Control object 907, Group Send Protocol object 908, Group Interface object 909, and Group Service object 910.

Resource Group Policy object 901 is a Group Policy and controls the server side management and control for distributed resources. A Group Policy manages and controls group membership, the handling of events (joins, leaves, failures, and member state changes), the state of individual members, the management and control of transport I/O, and the ability of clients to have individual sessions with one or more of the group members. There are two different types of Resource Group Policies. One type of Resource Group Policy expects all resources to be numbered consecutively over a specified numbered range. Distributed servers are assigned subsets of numbered resources. Allocation requests and release requests are sent to a resource server according to the resource identity. The second type of Resource Group Policy is for the case of non-contiguous resources (i.e., resources that have gaps in their identity).

The policy maps resources to a variable number of servers in an equitable manner. Resource Group Policy object 901 contains the following components:

i) Resource Group Configuration object 902 defines the transport protocol used between members.

ii) Policy Group Membership object 903 tracks the membership of resource servers. Servers may join or leave the group at anytime. In addition, member servers may fail at anytime. When members join, leave, or fail, the object triggers resource assignments based upon the number of available members.

iii) PB Policy Event Notification object 904 detects join, leave, fail, or state change events and dispatches those events to elements within the group policy. PB Policy Event Notification object 904 also dispatches events to members.

iv) PB Member State Control object 905 controls the election of the leader of the group. In addition to servicing allocation and release requests, the selected server must assign resources to available servers. If a leader should leave or fail, the backup for the leader takes over as the new leader.

v) Resource Policy IO Control object 906 assists a resource server in handing off resources to other members when the member leaves or new members are added to the group. Resource Policy IO Control object 906 also controls the dispatching of resource requests to the correct resource server.

vi) Resource Session Control object 907 controls the selection of a member server based upon the identity of the resource.

vii) Group Send Protocol object 908 controls the internal group protocol between members and clients of members.

viii) Group Interface object 909 controls the multicast transport.

ix) Group Service object 910 is used to instantiate the Resource Group Policy object 901 as a protocol stack. Server applications identify the instance name for the resource group and the group policy name (either MRG or NRG or Mapped Resource Group or Numbered Resource Group, respectively). Applications implement a Resource Adaptor interface to become a resource server.

Figure 10:
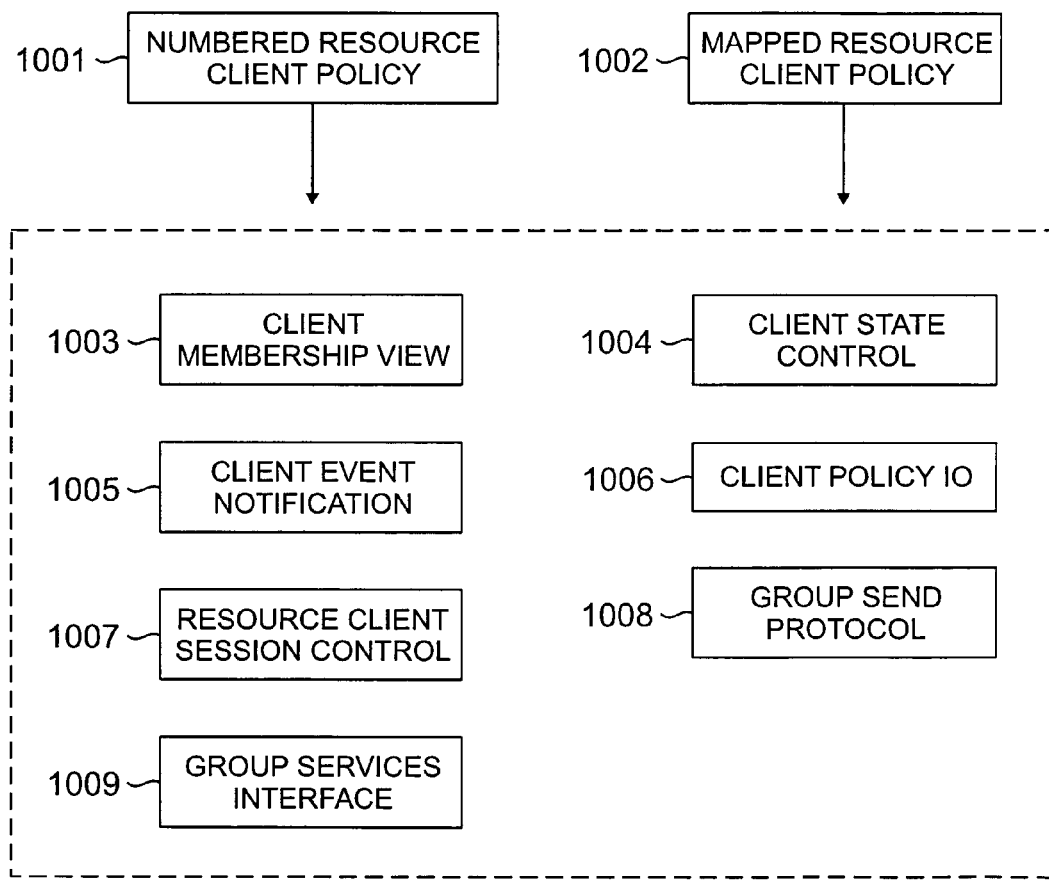
FIG. 10 illustrates exemplary software objects in a client-side group architecture for distributed resource servers according to an embodiment of the present invention.

FIG. 10 is an illustration of exemplary software objects in a client-side group architecture for distributed resource servers according to an embodiment of the present invention. A client side policy is provided for distributed resource allocation primarily for the purpose of transparently locating a server for a specific resource. The client side policy reacts to server failures and joins and redirects resource requests to those servers that are assigned resources by the Resource Group leader. The software objects comprise: Numbered Resource Client Policy object 1001, Mapped Resource Client Policy object 1002, Client Membership View object 903, Client State Control object 1004, Client Event Notification object 1005, Client Policy IO object 1006, Resource Client Session Control object 1007, Group Send Protocol object 1008, and Group Services Interface object 1009.

There are two types of distributed resource allocation groups: 1) Numbered Resource Client Policy object 1001 for those resources that are contiguously numbered and 2) Mapped Resource client Policy object 1002 for those that are not numbered contiguously and may also have gaps in their identities. Numbered Resource Client Policy object 1001 and Mapped Resource client Policy object 1002 have the following components:

i) Client Membership View object 1003 tracks the group membership and directs other components to react to the changing membership.

ii) Client State Control object 1004 tracks the state of members and modifies interfaces based upon that state value.

iii) Client Event Notification object 1005 delivers membership events to client objects that are interested. These events include join, leave, fail, and state change.

iv) Client Policy IO object 1006 controls the transport path to individual members. Typically, the transport path is over TCP/IP to a transparent primary-backup group interface.

v) Resource Client Session Control object 1007 locates specific servers given a specific resource identity. The Resource Client Session Control object 1007 is updated with server resource assignments as they occur.

vi) Group Send Prototol object 1008 handles the internal group service protocol.

vii) GS Interface object 1009 handles the multicast transport that is used for resource changes and internal group communication.

Performing an online software upgrade for a centralized server presents unique problems because the centralized server must be shared across both the New partition and the Reference partition. Clients in both partitions must be able to access the centralized server regardless of what partition the client is in. This makes it difficult to upgrade the centralized server software. The present invention provides a solution to this problem.

An Upgrade Adaptor Group (UAG) is a super group used to assist in the online software upgrade for centralized servers. Typically, a centralized server is in a primary-backup configuration in order to provide high availability. Prior to the start of the online software upgrade process, there is only one member in the UAG super group. The member resides in the Reference partition and services resource requests from elements in the network. At some point, some application nodes within a network are selected for online software upgrade. These nodes are brought down, the new software load is installed, and the nodes are brought up in the New Partition.

A centralized resource server application may be upgraded as part of this process. The centralized resource server application joins the UAG and is immediately selected as the leader. All client interfaces to the UAG are internally redirected to the member in the New partition. Meanwhile, the UAG member in the Reference partition starts to transfer resource responsibility to the New partition member. As the New partition member receives client requests, it only handles those requests concerning resources over which it has control. For all other requests, the New UAG member transfers the requests to the Reference member. Eventually, all resources are transferred to the New member. The Reference member is then brought down and upgraded. After the online software upgrade process is completed, the New partition member becomes the Reference member.

Figure 11:
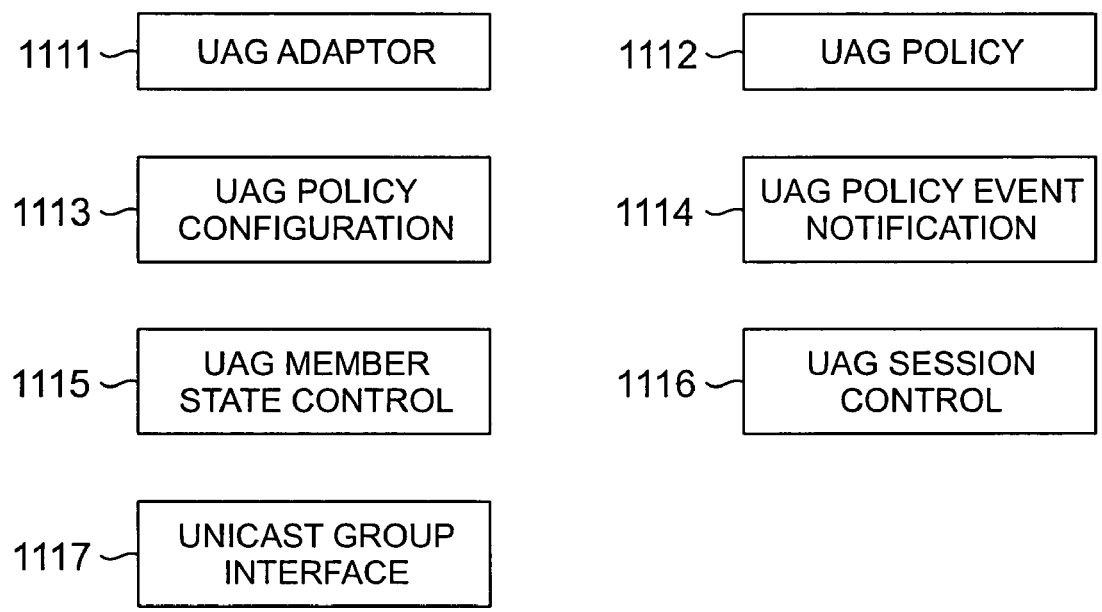
FIG. 11 illustrates exemplary software objects in a server-side group architecture for centralized resource servers is according to one embodiment of the present invention.

FIG. 11 is an illustration of exemplary software objects in a server-side group architecture for centralized resource servers according to one embodiment of the present invention. The software objects comprise: UAG Adaptor object 1111, UAG Policy object 1112, UAG policy Configuration object 1113, UAG Policy Event Notification object 1114, UAG member State Control object 1115, UAG Session Control object 1116, and Unicast Group Interface object 1117.

Upgrade Adaptor Group (UAG) Adaptor object 111 is a super group whose members are a primary in a primary-backup group. When there is no online software upgrade in progress, there is only one member of the group, which is called the leader. When the online upgrade process begins, a new member of the UAG joins in the New partition. The UAG policy automatically elects the New member as the leader. All client requests are routed to the New member. When the New member joins, the Reference member starts transferring resources from itself to the New member. This transfer may be selectively throttled. Any client requests are always directed to the New member. If the New member handles the requested resources it returns a response to the client. If, however, the New member does not handle the requested resources, the request is redirected to the Reference member.

UAG Policy object 1112 is a server side policy of centralized servers configured as a primary-backup group. UAG Policy object 1112 permits the online software upgrade of such servers while making the upgrade process transparent to any and all clients for those services. UAG Policy object 1112 controls the leader election in the presence of faults, controls the redirection of client requests, and permits an efficient and fast mechanism for transferring resource responsibility from the Reference partition member to the New partition member.

UAG Policy Configuration object 1113 and Unicast Group Interface object 1117 configure the use of a TCP/IP link for transferring resource responsibility. UAG Policy Event Notification object 1114 detects when members join, leave, or fail and triggers UAG Member State Control object 1115 to determine the leader of the group. UAG Member State Control object 1115 contains a state machine for leader election in the presence of faults. UAG Session Control object 1116 directs client requests to the leader.

Server applications use UAG Adaptor object 1115 in order to receive resource transfers or send resource transfers. Also, the server applications set the name of the primary-backup group into UAG Adaptor object 1115 name. UAG Adaptor object 1115 inserts the partition prefix. This permits client interfaces to locate the proper leader regardless of the partition in which the client is located.

Figure 12:
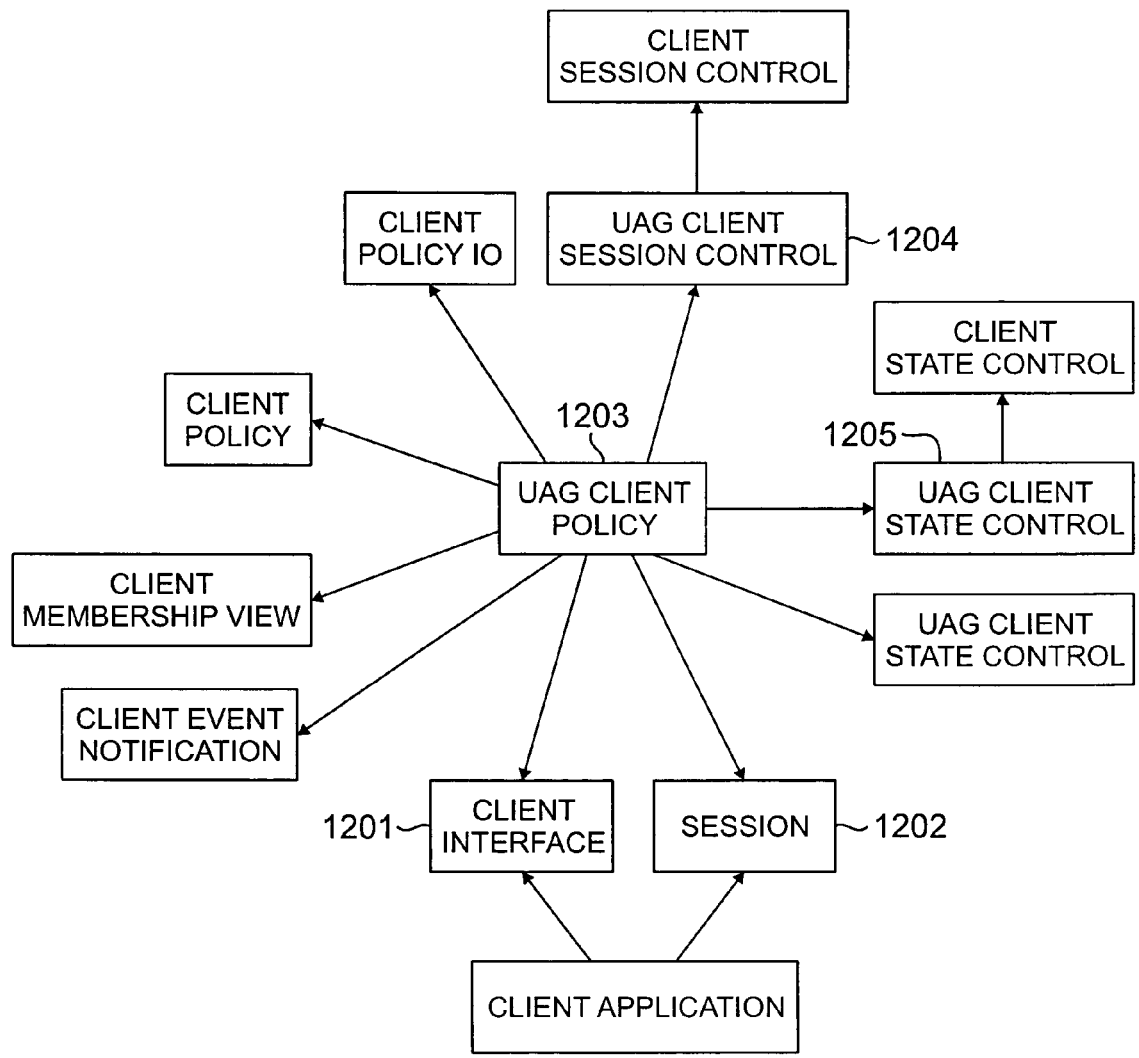
FIG. 12 illustrates exemplary software objects in a client-side group architecture for centralized resource servers according to one embodiment of the present invention.

FIG. 12 is an illustration of exemplary software objects in a client-side group architecture for centralized resource servers according to one embodiment of the present invention. The software objects comprise among others: Client Interface object 1201, Session object 1202, UAG Client Policy 1203, UAG Client Session Control object 1204, and UAG Client State Control object 1205.

The client policy controls the interface to the leader primary-backup group regardless of what partition the leader is in or what partition the client is in. When a client application obtains Client Interface object 1201 when the interface to the UAG Adaptor is constructed, the client application opens Session object 1202, which provides an interface to the UAG leader. Session object 1202 is updated when the leadership of the group changes. UAG Client Policy object 1203 is a Client Policy and adds the following classes:

i) UAG Client Session Control object 1204 controls session access to the UAG leader.

ii) UAG Client State Control object 1205 detects leader state changes and changes to the session interfaces.

Figure 13:
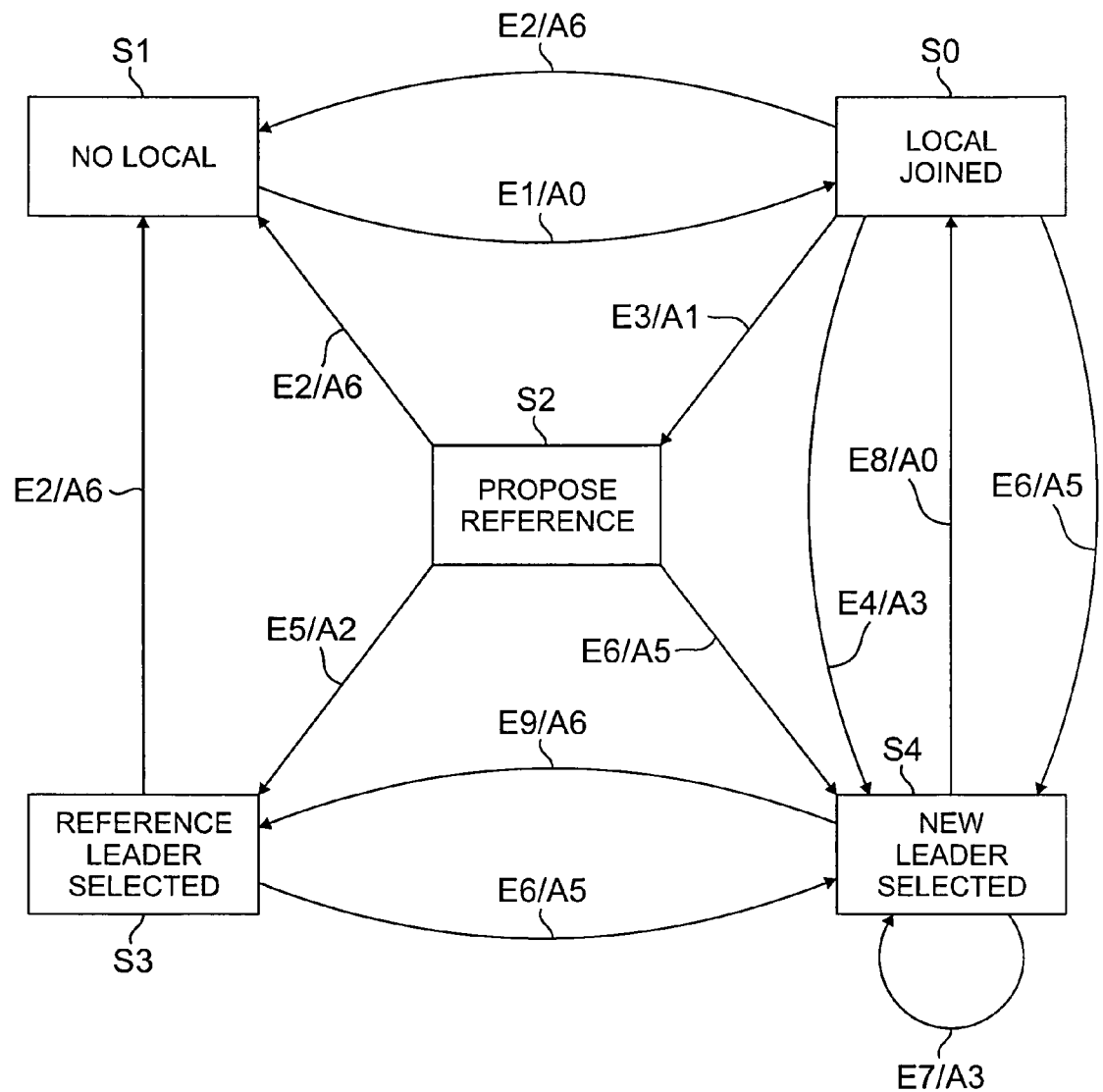
FIG. 13 illustrates a state machine diagram for leader election according to an exemplary embodiment of the present invention.

FIG. 13 illustrates a state machine diagram for leader election according to an exemplary embodiment of the present invention. The state machine for leader election in a UAG super group in the presence of faults has the states S0, S1, S2, S3 and S4. State S0 indicates a No Local Member state. State S1 indicates a Local Member Joined state. State S2 indicates a Propose Reference state. State S3 indicates a Reference Leader Selected state. State S4 indicates a New Leader Selected state.

The possible trigger events for the state machine are Events E1-E9, as follows:
 i) Event E1—"Local Join" event indicates a local member has joined the group.
 ii) Event E2—"Local Left" event indicates a local member has left the group.
 iii) Event E3—"IsReference" event indicates a local member is in the Reference partition.
 iv) Event E4—"IsNew" event indicates a local member is in the new partition.
 v) Event E5—"T1 Timeout" event indicates no other member replied to the proposal for leadership of the member in the Reference partition within time period T1.
 vi) Event E6—"Receive New Proposal" event indicates a proposal was received for leadership from a member in the New partition.
 vii) Event E7—"Receive Reference Proposal" event indicates a proposal was received for leadership from a member in the Reference partition.
 viii) Event E8—"New Leader Left or Failed" event indicates the leader in the New partition is no longer a member of the group.
 ix) Event E9—"BecomeReference" event occurs at the end of an online upgrade and indicates that the upgrade was successful. The New Partition now becomes the Reference partition and remains so until a new online software upgrade occurs.

Actions A0-A6 are performed by the state machine under certain states and trigger events, as follows:
 i) Action A0—Determine the local partition.
 ii) Action A1—Send a Propose Reference Leader message and start the T1 timer.
 iii) Action A2—Set the reference leader.
 iv) Action A3—Set a local member as the new leader and sends a Propose New Leader message.
 v) Action A4—Set a local member as the new leader.
 vi) Action A5—Set the remote member as the new leader.
 vii) Action A6—Do nothing.

By way of example, the line "E2/A6" between state S0 and state S1 indicates that if the leader election state machine is initially in state S0 (Local Member Joined) and event E2 (Local Member Left) occurs, then the leader election state machine moves to state S1 (No Local Member) and action A6 (Do Nothing) is taken.

Although the present invention has been described in detail, those skilled in the art should understand that they may make various changes, substitutions and alterations herein without departing from the spirit and scope of the invention in its broadest form.

What is claimed is:

1. A switch capable of handling call connections between calling devices and called devices, said switch comprising:
 at least one system management node associated with a configuration management controller, said configuration management controller capable of performing an online upgrade of software in said switch by loading upgraded software in a new partition while original software is executed in a reference partition; and
 a plurality of computing nodes capable of executing primary-backup resource server applications, each of said primary-backup resource server applications comprising a primary resource server application and a secondary resource server application residing on a different node than said primary resource server application, wherein a plurality of said primary-backup resource server applications form a resource group and wherein an address of said resource group is known in said reference partition and in said new partition.

2. The switch as set forth in claim 1, wherein all of said primary primary-backup resource server applications initially reside in said reference partition.

3. The switch as set forth in claim 2, wherein said configuration management controller loads upgraded software of a first primary-backup resource server application resides in said new partition.

4. The switch as set forth in claim 3, wherein said configuration management controller is capable of partitioning an address space of a service request broker, wherein a first address of a first service request broker associated with said new partition is different than a second address of a second service request broker associated with said reference partition.

5. The switch as set forth in claim 4, wherein said configuration management controller starts said upgraded software of said first primary-backup resource server application in said new partition with said first address of said first service request broker.

6. The switch as set forth in claim 5, wherein said configuration management controller tests said upgraded software of said first primary-backup resource server application after said upgraded software has been loaded into said new partition.

7. The switch as set forth in claim 6, wherein said configuration management controller, in response to a determination that said upgraded software passes said testing, shuts down each computing node in said reference partition, installs said upgraded software in said reference partition, changes said service request broker address to said new partition, and restarts said nodes in said new partition.

8. A method for use in a switch comprising a plurality of computing nodes that execute primary-backup resource server applications, each of the primary-backup resource server applications comprising a primary resource server application and a secondary resource server application residing on a different node than the primary resource server application, wherein a plurality of the primary-backup resource server applications form a resource group and wherein an address of the resource group is known in the reference partition and in the new partition, the method comprising the steps of:
 loading upgraded software of a first primary-backup resource server application resides in a new partition while original software associated with other primary-backup resource server applications is executed in a reference partition;
 partitioning an address space of a service request broker, wherein a first address of a first service request broker associated with the new partition is different than a second address of a second service request broker associated with the reference partition; and starting the upgraded software of the first primary-backup resource server application in the new partition with the first address of the first service request broker.

9. The method as set forth in claim 8, wherein all of the primary primary-backup resource server applications initially reside in the reference partition.

10. The method set forth in claim 8, further comprising the step of testing the upgraded software of the first primary-backup resource server application after the upgraded software has been loaded into the new partition.

11. The method as set forth in claim 10, further comprising the steps, in response to a determination that the upgraded software passes the testing, of:

shutting down each computing node in the reference partition;

installing the upgraded software in the reference partition, changing the service request broker address to the new partition; and restarting the nodes in the new partition.

* * * * *